US010739374B2

(12) United States Patent
Tanaka

(10) Patent No.: US 10,739,374 B2
(45) Date of Patent: Aug. 11, 2020

(54) PHYSICAL QUANTITY SENSOR, PHYSICAL QUANTITY SENSOR DEVICE, COMPOSITE SENSOR DEVICE, INERTIAL MEASUREMENT UNIT, ELECTRONIC APPARATUS, AND VEHICLE

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 72 days.

(21) Appl. No.: 16/201,044

(22) Filed: Nov. 27, 2018

(65) Prior Publication Data

US 2019/0162750 A1 May 30, 2019

(30) Foreign Application Priority Data

Nov. 28, 2017 (JP) ................. 2017-228266

(51) Int. Cl.
| | | |
|---|---|---|
| G01C 19/5733 | (2012.01) | |
| G01P 15/08 | (2006.01) | |
| G01P 15/125 | (2006.01) | |
| G01C 19/56 | (2012.01) | |
| G01P 15/097 | (2006.01) | |

(52) U.S. Cl.
CPC .......... *G01P 15/0802* (2013.01); *G01C 19/56* (2013.01); *G01P 15/097* (2013.01); *G01P 15/125* (2013.01)

(58) Field of Classification Search
CPC ... G01L 19/003; G01L 19/147; G01L 9/0041; G01L 19/142; G01L 19/0038; Y10T 29/49103; Y10T 29/49774; Y10T 29/49927; Y10T 29/49918
See application file for complete search history.

(56) References Cited

U.S. PATENT DOCUMENTS

| | | | |
|---|---|---|---|
| 5,987,989 A | 11/1999 | Yamamoto et al. | |
| 6,925,413 B2* | 8/2005 | Krieg | .................. B60R 21/0132 |
| | | | 702/152 |
| 2005/0217372 A1* | 10/2005 | Ao | ...................... G01C 19/5719 |
| | | | 73/488 |
| 2009/0199637 A1* | 8/2009 | Sugiura | ............... G01P 15/0802 |
| | | | 73/514.32 |

FOREIGN PATENT DOCUMENTS

| | | |
|---|---|---|
| JP | 2002-148278 A | 5/2002 |
| JP | 2007-139505 A | 6/2007 |
| JP | 5790429 B2 | 10/2015 |

* cited by examiner

*Primary Examiner* — Brandi N Hopkins
(74) *Attorney, Agent, or Firm* — Harness, Dickey & Pierce, P.L.C.

(57) ABSTRACT

A inertial sensor includes a substrate, a fixed portion that is fixed to the substrate, a movable portion is connected to the fixed portion, and is displaceable in an X axis direction, and a movable electrode that is supported at the movable portion, and a frame part includes a first edge that is located on one side of the X axis direction, and is disposed along a Y axis direction, and a second edge that is located on the other side of the X axis direction, and is disposed along the Y axis direction. The fixed portion is disposed further toward the second edge than the first edge, and the substrate includes a first projection that overlaps the first edge, and is disposed to be separated from the first edge, and a second projection that overlaps the second edge, and is disposed to be separated from the second edge.

15 Claims, 24 Drawing Sheets

PHYSICAL QUANTITY SENSOR, PHYSICAL QUANTITY SENSOR DEVICE, COMPOSITE SENSOR DEVICE, INERTIAL MEASUREMENT UNIT, ELECTRONIC APPARATUS, AND VEHICLE

CROSS-REFERENCE TO RELATED APPLICATION

This nonprovisional application claims the benefit of Japanese Patent Application No. 2017-228266 filed Nov. 28, 2017, the entire disclosure of which is incorporated herein by reference.

BACKGROUND

1. Technical Field

The present invention relates to a physical quantity sensor, a physical quantity sensor device, a composite sensor device, an inertial measurement unit, a vehicle positioning apparatus, a portable electronic apparatus, an electronic apparatus, and a vehicle.

2. Related Art

For example, an acceleration sensor disclosed in JP-A-2007-139505 includes a substrate, a movable portion which is displaceable with respect to the substrate, a movable detection electrode provided at the movable portion, and a fixed detection electrode which is fixed to the substrate and forms an electrostatic capacitor with the movable detection electrode. In this configuration, in a case where acceleration is applied, the movable portion is displaced with respect to the substrate, as a result, the electrostatic capacitor between the movable detection electrode and the fixed detection electrode is displaced, and thus the acceleration can be measured on the basis of a change in a capacitance of the electrostatic capacitor.

However, in the acceleration sensor in JP-A-2007-139505, in a case where acceleration in a direction (Z axis direction) perpendicular to the substrate is applied, the movable portion is excessively displaced in the Z axis direction, and thus the movable portion is damaged due to stress caused by the displacement, or the movable portion is brought into contact with the substrate such that so-called "sticking" occurs in which the movable portion is stuck to the substrate. Therefore, there is a problem in that there is concern that the acceleration sensor may not function as an acceleration sensor.

SUMMARY

An advantage of some aspects of the invention is to provide a physical quantity sensor, a physical quantity sensor device, a composite sensor device, an inertial measurement unit, a vehicle positioning apparatus, a portable electronic apparatus, an electronic apparatus, and a vehicle, capable of reducing excessive displacement of a movable portion.

The invention can be implemented as the following configurations.

A physical quantity sensor includes a substrate; a fixed portion that is fixed to the substrate; a movable portion that includes a frame part surrounding the fixed portion in a plan view, is connected to the fixed portion, and is displaceable in a first direction with respect to the substrate; and a movable electrode that is supported at the movable portion, in which the frame part includes a first outer edge that is located on one side of the first direction, and is disposed along a second direction orthogonal to the first direction, and a second outer edge that is located on the other side of the first direction, and is disposed along the second direction, in which the fixed portion is disposed further toward the second outer edge than the first outer edge, and in which the substrate includes a first projection part that overlaps the first outer edge in a plan view, and is disposed to be separated from the first outer edge, and a second projection part that overlaps the second outer edge in a plan view, and is disposed to be separated from the second outer edge.

With this configuration, it is possible to reduce excessive displacement of the movable portion due to contact between the first projection part and the second projection part.

In the physical quantity sensor, it is preferable that the movable portion is displaced in a third direction orthogonal to the first direction and the second direction, so as to be brought into contact with the first projection part and the second projection part, and a contact area of the movable portion and the first projection part is larger than a contact area of the movable portion and the second projection part.

With this configuration, it is possible to reduce an impact during contact between the movable portion and the first projection part and thus to reduce damage of the movable portion or the first projection part.

In the physical quantity sensor, it is preferable that the first projection part and the second projection part are included in the movable portion in a plan view.

With this configuration, it is possible to reduce contact between the first projection part and the second projection part, and portions other than the movable portion.

It is preferable that the physical quantity sensor further includes an electrode that is disposed in at least a part of a region overlapping the movable portion in a plan view on a surface of the substrate on the movable portion side, and the electrode has the same potential as a potential of the movable portion.

With this configuration, it is possible to reduce unintended displacement of the movable portion.

It is preferable that the physical quantity sensor further includes a beam that has a longitudinal shape along the first direction and of which one end is connected to the fixed portion; and a spring that connects the other end of the beam to the movable portion, and the substrate includes a third projection part that overlaps the beams in a plan view, and is disposed to be separated from the beam.

With this configuration, it is possible to reduce excessive displacement of the movable portion.

In the physical quantity sensor, it is preferable that the movable portion includes a stem part that is located inside the frame part in a plan view, and has a longitudinal shape along the first direction, and the substrate includes a fourth projection part that overlaps the stem part in a plan view, and is separated from the stem part.

With this configuration, it is possible to reduce excessive displacement of the movable portion.

It is preferable that the physical quantity sensor measures acceleration.

With this configuration, it is possible to provide the highly convenient physical quantity sensor.

A physical quantity sensor device includes the physical quantity sensor; and a circuit element.

With this configuration, it is possible to achieve the effect of the physical quantity sensor, and thus to provide the physical quantity sensor device with high reliability.

A composite sensor device includes a first physical quantity sensor that is the physical quantity sensor; and a second physical quantity sensor that measures a physical quantity which is different from a physical quantity measured by the first physical quantity sensor.

With this configuration, it is possible to achieve the effect of the physical quantity sensor, and thus to provide the composite sensor device with high reliability.

An inertial measurement unit includes the physical quantity sensor; and a control circuit that controls driving of the physical quantity sensor.

With this configuration, it is possible to achieve the effect of the physical quantity sensor, and thus to provide the inertial measurement unit with high reliability.

A vehicle positioning apparatus includes the inertial measurement unit; a reception section that receives a satellite signal on which position information is superimposed from a positioning satellite; an acquisition section that acquires position information of the reception section on the basis of the received satellite signal; an operating section that calculates an attitude of a vehicle on the basis of inertial data output from the inertial measurement unit; and a calculation section that calculates a position of the vehicle by correcting the position information on the basis of the calculated attitude.

With this configuration, it is possible to achieve the effect of the inertial measurement unit, and thus to provide the vehicle positioning apparatus with high reliability.

A portable electronic apparatus includes the physical quantity sensor; a case in which the physical quantity sensor is accommodated; a processing section that is accommodated in the case and processes data output from the physical quantity sensor; a display section that is accommodated in the case; and a light transmissive cover that closes an opening of the case.

With this configuration, it is possible to achieve the effect of the physical quantity sensor, and thus to provide the portable electronic apparatus with high reliability.

It is preferable that the portable electronic apparatus includes a satellite positioning system, and measures a movement distance or a movement trajectory of a user.

With this configuration, it is possible to provide the more highly convenient portable electronic apparatus.

An electronic apparatus includes the physical quantity sensor; and a control section that performs control on the basis of a measurement signal output from the physical quantity sensor.

With this configuration, it is possible to achieve the effect of the physical quantity sensor, and thus to provide the electronic apparatus with high reliability.

A vehicle includes the physical quantity sensor; and a control section that performs control on the basis of a measurement signal output from the physical quantity sensor.

With this configuration, it is possible to achieve the effect of the physical quantity sensor, and thus to provide the vehicle with high reliability.

It is preferable that the vehicle includes at least one system among an engine system, a brake system, and a keyless entry system, and the control section controls the system on the basis of the measurement signal.

With this configuration, it is possible to control the system with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, a physical quantity sensor device, a composite sensor device, an inertial measurement unit, a vehicle positioning apparatus, a portable electronic apparatus, an electronic apparatus, and a vehicle will be described in detail on the basis of embodiments illustrated in the accompanying drawings.

First Embodiment

First, a physical quantity sensor according to a first embodiment will be described.

Figure 1:
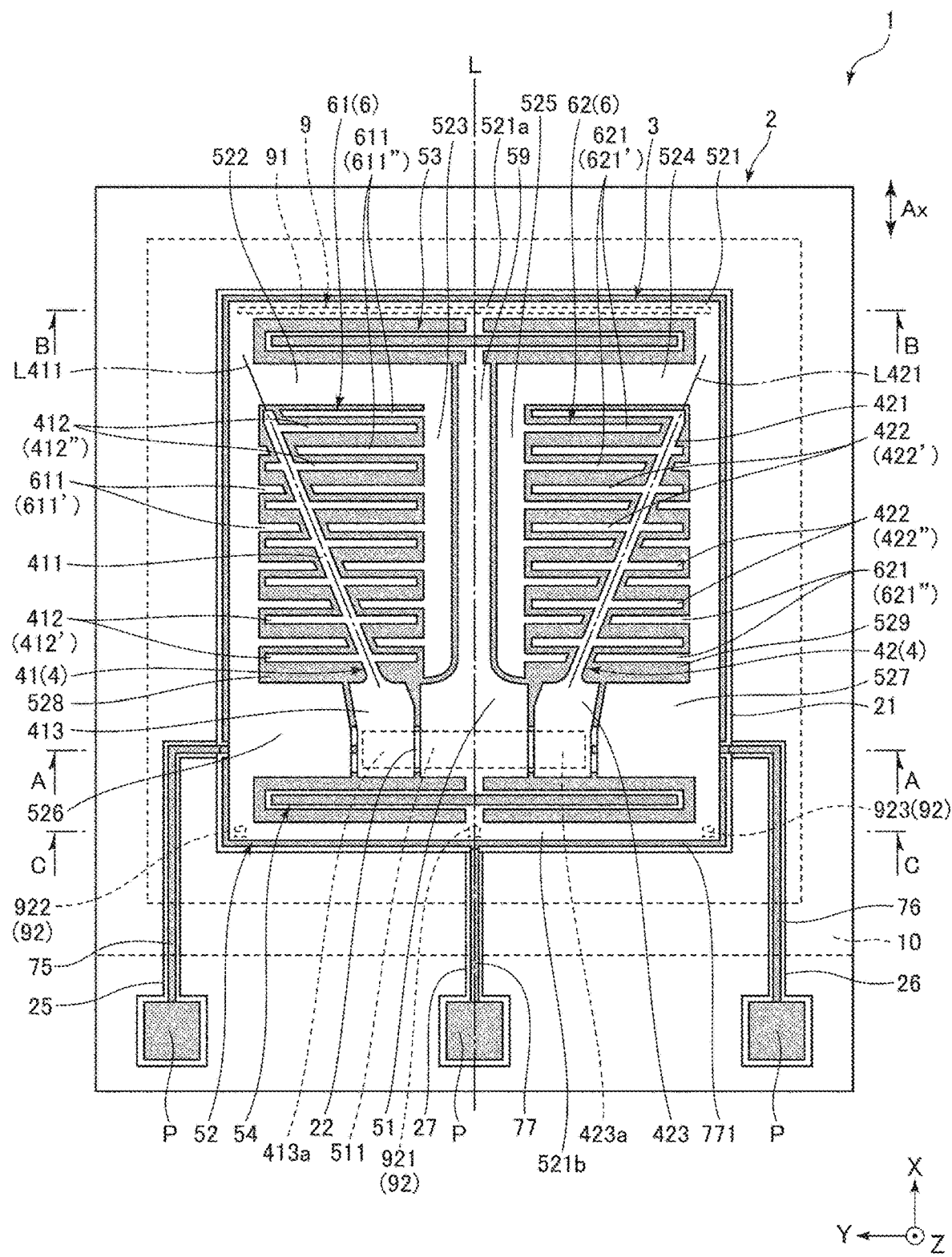
FIG. 1 is a plan view illustrating a physical quantity sensor according to a first embodiment.
Figure 2:
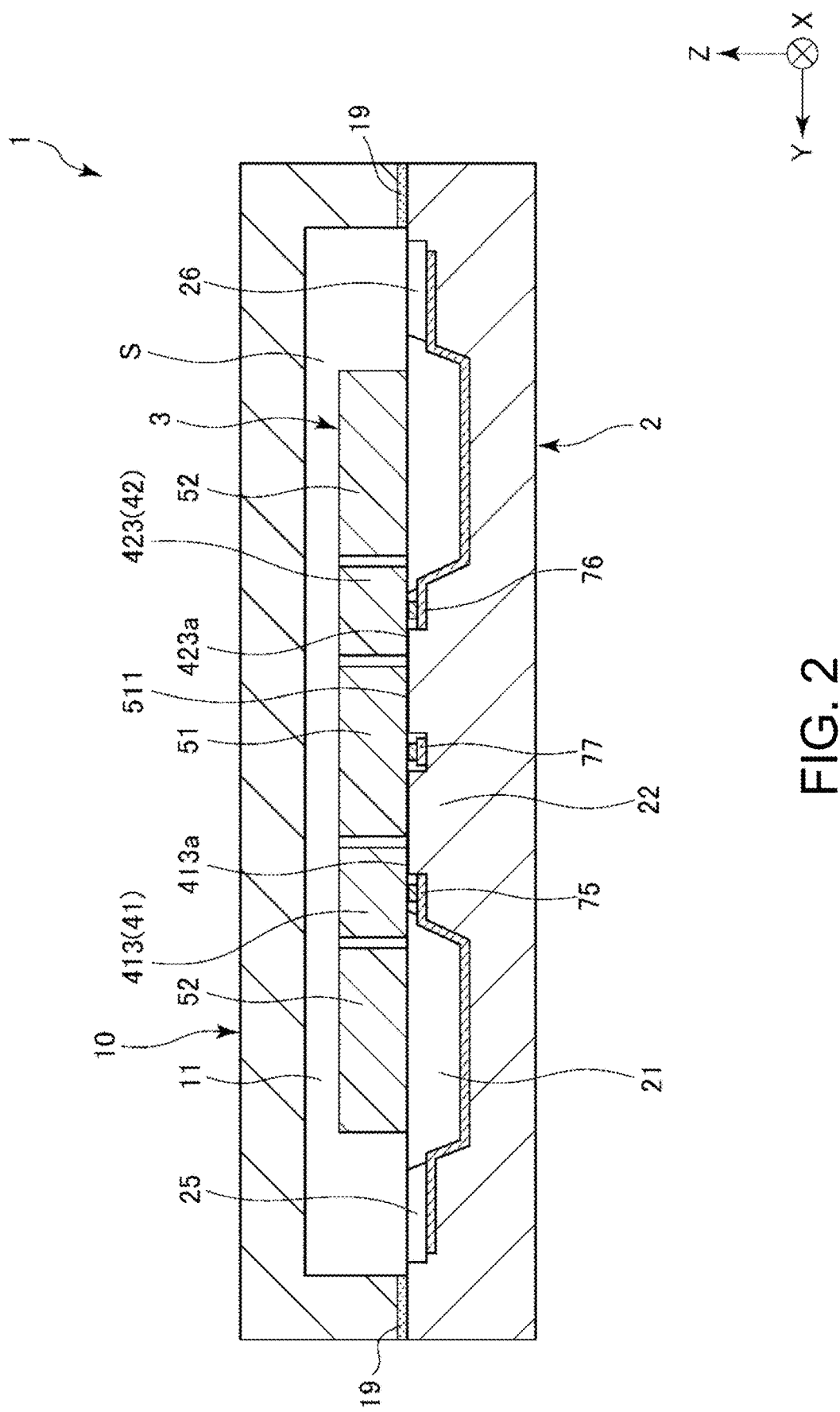
FIG. 2 is a sectional view taken along a line A-A in FIG. 1.
Figure 3:
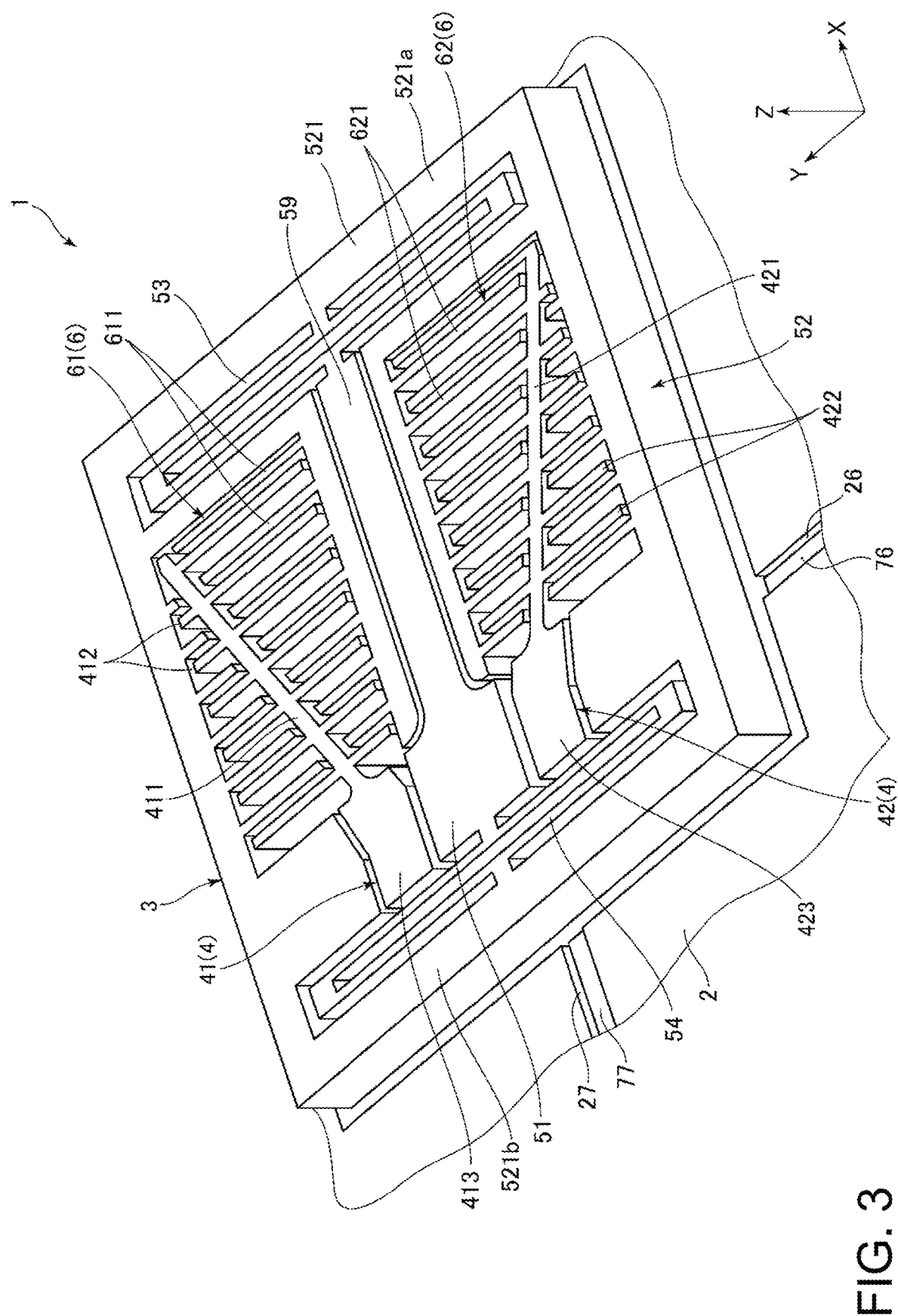
FIG. 3 is a perspective view of the physical quantity sensor illustrated in FIG. 1.
Figure 4:
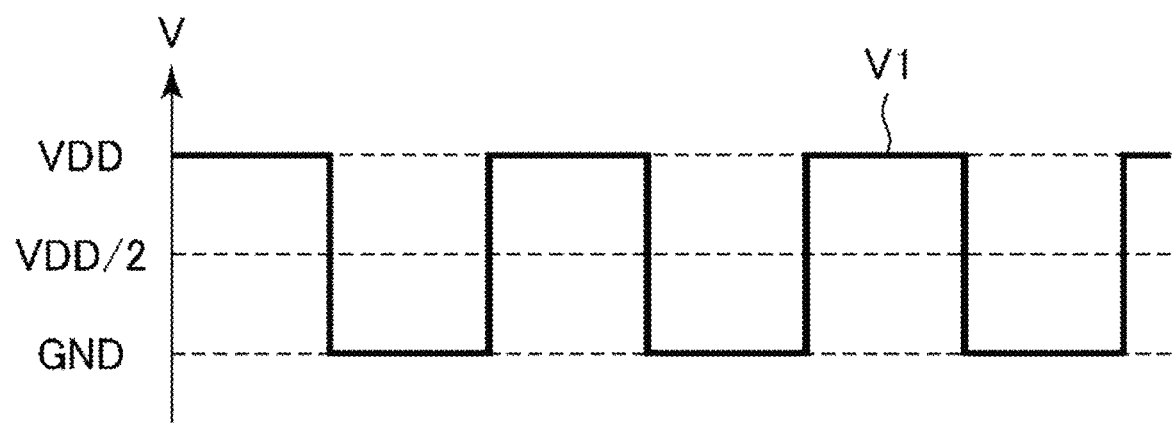
FIG. 4 is a diagram illustrating voltages applied to the physical quantity sensor illustrated in FIG. 1.
Figure 5:
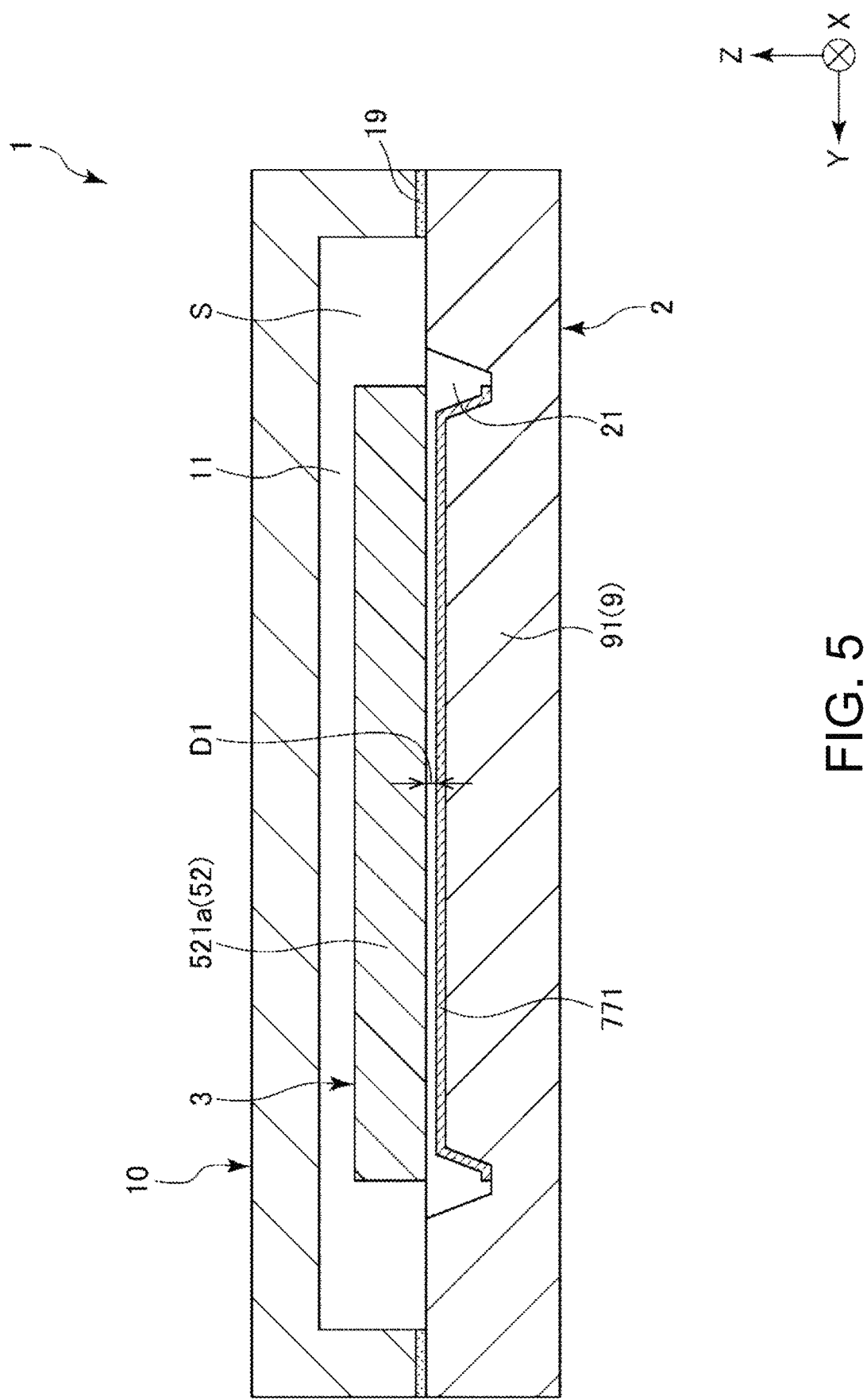
FIG. 5 is a sectional view taken along a line B-B in FIG. 1.
Figure 6:
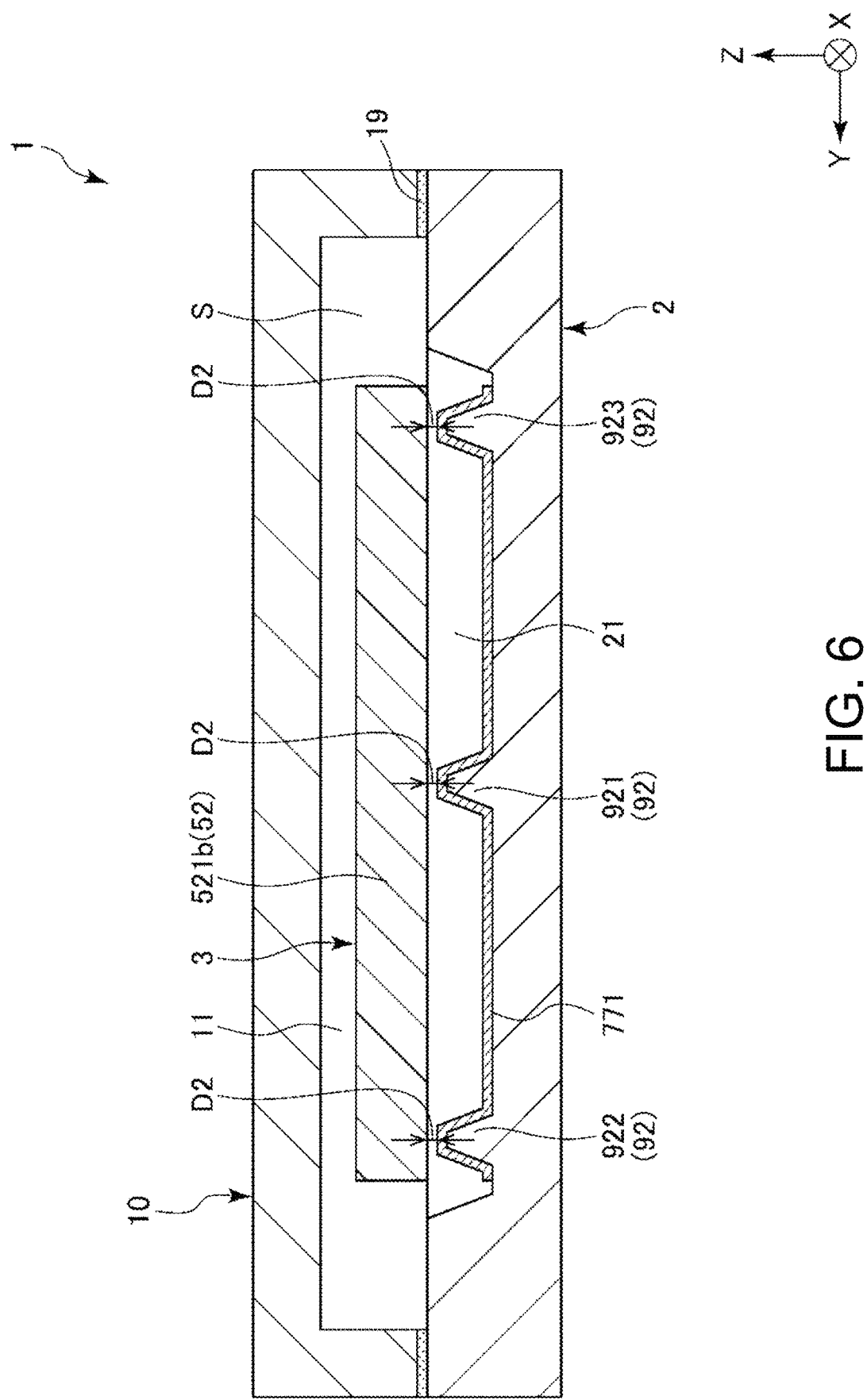
FIG. 6 is a sectional view taken along a line C-C in FIG. 1.

FIG. 1 is a plan view illustrating a physical quantity sensor according to the first embodiment. FIG. 2 is a sectional view taken along a line A-A in FIG. 1. FIG. 3 is a perspective view of the physical quantity sensor illustrated in FIG. 1. FIG. 4 is a diagram illustrating voltages applied to the physical quantity sensor illustrated in FIG. 1. FIG. 5 is a sectional view taken along a line B-B in FIG. 1. FIG. 6 is a sectional view taken along a line C-C in FIG. 1. Hereinafter, for convenience of description, three axes orthogonal to each other will be referred to as an X axis, a Y axis, and a Z axis, a direction parallel to the X axis will be referred to as an "X axis direction", a direction parallel to the Y axis will be referred to as a "Y axis direction", and a direction parallel to the Z axis will be referred to as a "Z axis direction". A tip side of each axis in an arrow direction will be referred to as a "positive side", and an opposite side thereto will be referred to as a "negative side". A Z axis direction positive side will be referred to as an "upper side", and a Z axis direction negative side will be referred to as a "lower side".

In the present specification, the term "orthogonal" includes not only a case where two elements intersect each other at 90° but also a case where two elements intersect each other at an angle (for example, 90°±10°) which is slightly inclined from 90°. Specifically, a case where the X axis is inclined by about ±10° with respect to a normal direction to a YZ plane, a case where the Y axis is inclined by about ±10° with respect to a normal direction to an XZ plane, and a case where the Z axis is inclined by about ±10° with respect to a normal direction to an XY plane are also included in the term "orthogonal".

A physical quantity sensor 1 illustrated in FIG. 1 is an acceleration sensor which can measure an acceleration Ax in the X axis direction. The physical quantity sensor 1 includes a substrate 2, a sensor element 3 which is provided on the substrate 2 and measures the acceleration Ax (physical quantity) in the X axis direction, and a lid 10 which is bonded to the substrate 2 so as to cover the sensor element 3.

As illustrated in FIG. 1, the substrate 2 has a rectangular shape in a plan view. The substrate 2 has a depressed portion 21 which is open to an upper surface side thereof. The depressed portion 21 is formed to be larger than the sensor element 3 so as to include the sensor element 3 inside thereof in a plan view from the Z axis direction. The depressed portion 21 functions as a relief portion for preventing the sensor element 3 from being brought into contact with the substrate 2. A plan view shape of the substrate 2 is not particularly limited, and may be any shape, for example, a triangular shape, a quadrangular shape such as a trapezoidal shape or a parallelogram shape, a polygonal shape such as a pentagonal shape, a circular shape, an elliptical shape, or an irregular shape.

As illustrated in FIG. 2, the substrate 2 includes a mount 22 having a protrusion shape provided on a bottom surface of the depressed portion 21. The mount 22 is bonded to a first fixed electrode 41, a second fixed electrode 42, and a fixed portion 51 provided in the sensor element 3. As illustrated in FIG. 1, the substrate 2 includes groove portions 25, 26, and 27 which are open to the upper surface side thereof, and wires 75, 76, and 77 are respectively disposed in the groove portions 25, 26, and 27.

One end of each of the wires 75, 76, and 77 is exposed to the outside of the lid 10, and functions as a terminal P for electrical connection to an external device. As illustrated in FIG. 2, the wire 75 is electrically connected to the first fixed electrode 41 on the mount 22, the wire 76 is electrically connected to the second fixed electrode 42 on the mount 22, and the wire 77 is electrically connected to the fixed portion 51 on the mount 22. The wire 77 has an electrode 771 which is maintained in a state of being insulated from the wires 75 and 76 and is widely disposed on the bottom surface of the depressed portion 21.

As the substrate 2, a glass substrate made of a glass material (for example, borosilicate glass such as Pyrex glass or Tempax glass (all are registered trademarks)) containing alkali metal ions such as sodium ions may be used. Consequently, as will be described later, the sensor element 3 and the substrate 2 can be bonded together through anodic bonding, and can thus be firmly bonded to each other. However, the substrate 2 is not limited to a glass substrate, and, for example, a silicon substrate or a ceramic substrate may be used. In a case where a silicon substrate is used, from the viewpoint of preventing a short circuit, preferably, a high resistance silicon substrate is used, or a silicon substrate of which a silicon oxide film (insulating oxide) is formed on a surface through thermal oxidation or the like is used.

As illustrated in FIG. 1, the lid 10 has a rectangular shape in a plan view. As illustrated in FIG. 2, the lid 10 has a depressed portion 11 which is open to a lower surface side thereof. The lid 10 stores the sensor element 3 in the depressed portion 11, and is bonded to the substrate 2. A storage space S storing the sensor element 3 is formed by the lid 10 and the substrate 2. A plan view shape of the lid 10 is not particularly limited, and is determined in accordance with a plan view shape of the substrate 2, and may be any shape such as a triangular shape, a quadrangular shape such as a trapezoidal shape or a parallelogram shape, a polygonal shape such as a pentagonal shape, a circular shape, or an irregular shape.

The storage space S is enclosed with an inert gas such as nitrogen, helium, or argon, and is preferably substantially in the atmospheric pressure at a usage temperature (−40° C. to 120° C.). In a case where the storage space S is in the atmospheric pressure, viscous resistance increases such that a damping effect is exhibited, and thus vibration of the sensor element 3 can be made to rapidly converge. Thus, the measurement accuracy of the physical quantity sensor 1 for the acceleration Ax is improved.

The lid 10 is configured with a silicon substrate in the present embodiment. However, the lid 10 is not limited to a silicon substrate, and, for example, a glass substrate or a ceramic substrate may be used. A method of bonding the substrate 2 and the lid 10 to each other is not particularly limited, and may employ a method which is selected as appropriate depending on a material of the substrate 2 or the lid 10, and may employ, for example, anodic bonding, activation bonding in which bonding surfaces activated through plasma irradiation are bonded together, bonding using a bonding material such as glass frits, or diffusion bonding in which metal films formed on the upper surface of the substrate 2 and the lower surface of the lid 10 are bonded to each other. In the present embodiment, as illustrated in FIG. 2, the substrate 2 and the lid 10 are bonded to each other via glass frits 19 (low melting point glass).

As illustrated in FIGS. 1 and 3, the sensor element 3 includes a fixed electrode 4 fixed to the substrate 2, the fixed portion 51 fixed to the substrate 2, a beam 59 connected to the fixed portion 51, a movable portion 52 which is displaceable in the X axis direction with respect to the fixed portion 51, springs 53 and 54 connecting the fixed portion 51 to the movable portion 52, and a movable electrode 6 provided at the movable portion 52. Among the elements, the fixed portion 51, the beam 59, the movable portion 52, the springs 53 and 54, and the movable electrode 6 are integrally formed. Hereinafter, for convenience of description, a virtual axis which passes through the center of the sensor element 3 and extends in the X axis direction in a plan view from the Z axis direction will be referred to as a "central axis L".

The sensor element 3 may be formed, for example, by patterning a silicon substrate doped with an impurity such as phosphorus (P), boron (B), or arsenic (As) through etching (particularly, dry etching). The sensor element 3 is bonded to the mount 22 through anodic bonding. However, a material of the sensor element 3 or a method of bonding the sensor element 3 to the substrate 2 is not particularly limited.

The fixed portion 51 has a bonding part 511 bonded to the mount 22. The beam 59 is located on the X axis direction positive side of the fixed portion 51, and has a longitudinal shape along the X axis direction. An end of the beam 59 on the X axis direction negative side is connected to the fixed portion 51. In other words, the beam 59 has a longitudinal shape which extends from the fixed portion 51 toward the X axis direction positive side.

The movable portion 52 has a frame shape in a plan view from the Z axis direction, and surrounds the fixed portion 51, the springs 53 and 54, and the first and second fixed electrodes 41 and 42. As mentioned above, the movable portion 52 has a frame shape, and thus the mass of the movable portion 52 can be increased. Thus, the sensitivity of the physical quantity sensor 1 is improved, and thus the acceleration Ax can be measured with high accuracy. The movable portion 52 has a first opening part 528 in which the first fixed electrode 41 is disposed and a second opening part 529 in which the second fixed electrode 42 is disposed.

Regarding of a shape of the movable portion 52, more specifically, the movable portion 52 has a frame part 521 which surrounds the fixed portion 51, the springs 53 and 54, and the first and second fixed electrodes 41 and 42, a first Y-axis stem part 522 which is located on the X axis direction positive side of the first opening part 528 and extends from the frame part 521 toward the Y axis direction negative side, a first X-axis stem part 523 which extends from a tip of the first Y-axis stem part 522 toward the X axis direction negative side, a second Y-axis stem part 524 which is located on the X axis direction positive side of the second opening part 529 and extends from the frame part 521 toward the Y axis direction positive side, and a second X-axis stem part 525 which extends from a tip of the second Y-axis stem part 524 toward the X axis direction negative side. The first and second Y-axis stem parts 522 and 524 are provided along the spring 53, and the first and second X-axis stem parts 523 and 525 are disposed along the beam 59.

The movable portion 52 has a first protrusion part 526 which protrudes into the first opening part 528 from the frame part 521 so as to fill a remaining space of the first opening part 528, and a second protrusion part 527 which protrudes into the second opening part 529 from the frame part 521 so as to fill a remaining space of the second opening part 529. As mentioned above, the first and second protrusion parts 526 and 527 are provided, and thus the mass of the movable portion 52 can be increased without increasing a size of the movable portion 52. Thus, it is possible to provide the physical quantity sensor 1 with higher sensitivity.

The springs 53 and 54 are elastically deformable. The springs 53 and 54 are elastically deformed, and thus the movable portion 52 can be displaced in the X axis direction with respect to the fixed portion 51. As illustrated in FIG. 1, the spring 53 is located on the X axis direction positive side with respect to the fixed portion 51, and connects the frame part 521 of the movable portion 52 to the beam 59. On the other hand, the spring 54 is located on the X axis direction negative side with respect to the fixed portion 51, and connects the frame part 521 of the movable portion 52 to the fixed portion 51. Consequently, the movable portion 52 can be supported on both sides in the X axis direction, and an attitude and a behavior of the movable portion 52 are stabilized. Thus, unnecessary vibration (particularly, vibration around the Z axis) other than vibration in the X axis direction can be reduced, and thus the acceleration Ax can be measured with higher accuracy.

The fixed electrode 4 includes the first fixed electrode 41 located in the first opening part 528 and the second fixed electrode 42 located in the second opening part 529.

The first fixed electrode 41 has a first fixed portion 413 fixed to the substrate 2, a first stem portion 411 supported at the first fixed portion 413, and a plurality of first fixed electrode fingers 412 extending toward both sides in the Y axis direction from the first stem portion 411. The first fixed portion 413 has a bonding part 413a bonded to the mount 22.

The first stem portion 411 has a rod-like longitudinal shape, and one end thereof is connected to the first fixed portion 413. The first stem portion 411 is inclined with respect to each of the X axis and the Y axis in a plan view from the Z axis direction. Specifically, the first stem portion 411 is inclined such that a separation distance with the central axis L increases toward a tip side thereof. An inclination of an axis L411 of the first stem portion 411 with respect to the X axis is not particularly limited, but is preferably 10° or more and 45° or less, and is more preferably 10° or more and 30° or less. Consequently, it is possible to reduce spreading of the first fixed electrode 41 in the Y axis direction and thus to miniaturize the sensor element 3.

The first fixed electrode fingers 412 extend toward both sides in the Y axis direction from the first stem portion 411. In other words, the first fixed electrode fingers 412 have first fixed electrode fingers 412' located on the Y axis direction positive side of the first stem portion 411, and first fixed electrode fingers 412" located on the Y axis direction negative side. The first fixed electrode fingers 412' and 412" are respectively provided to be separated from each other in a plurality along the X axis direction.

Lengths of the plurality of first fixed electrode fingers 412' are gradually reduced toward the X axis direction positive side. On the other hand, lengths of the plurality of first fixed electrode fingers 412" are gradually increased toward the X axis direction positive side. A total length of the first fixed electrode fingers 412' arranged in the Y axis direction is substantially the same as a total length of the first fixed electrode fingers 412" arranged in the Y axis direction.

The second fixed electrode 42 has a second fixed portion 423 fixed to the substrate 2, a second stem portion 421 supported at the second fixed portion 423, and a plurality of second fixed electrode fingers 422 extending toward both sides in the Y axis direction from the second stem portion 421. The second fixed portion 423 has a bonding part 423a bonded to the upper surface of the mount 22.

The second stem portion 421 has a rod-like longitudinal shape, and one end thereof is connected to the second fixed portion 423. The second stem portion 421 is inclined with respect to each of the X axis and the Y axis in a plan view from the Z axis direction. More specifically, the second stem portion 421 is inclined such that a separation distance with the central axis L increases toward a tip side thereof. An inclination of an axis L421 of the second stem portion 421 with respect to the X axis is not particularly limited, but is preferably 10° or more and 45° or less, and is more preferably 10° or more and 30° or less. Consequently, it is possible to reduce spreading of the second fixed electrode 42 in the Y axis direction and thus to miniaturize the sensor element 3.

The second fixed electrode fingers 422 extend toward both sides in the Y axis direction from the second stem portion 421. In other words, the second fixed electrode fingers 422 have second fixed electrode fingers 422' located on the Y axis direction positive side of the second stem portion 421, and second fixed electrode fingers 422" located on the Y axis direction negative side. The second fixed electrode fingers 422' and 422" are respectively provided to be separated from each other in a plurality along the X axis direction.

Lengths of the plurality of second fixed electrode fingers 422' are gradually increased toward the X axis direction positive side. On the other hand, lengths of the plurality of second fixed electrode fingers 422" are gradually reduced toward the X axis direction positive side. A total length of the second fixed electrode fingers 422' arranged in the Y axis direction is substantially the same as a total length of the second fixed electrode fingers 422" arranged in the Y axis direction.

As mentioned above, in the physical quantity sensor 1, the bonding part 413a of the first fixed portion 413 is located on one side of the bonding part 511 of the fixed portion 51, and the bonding part 423a of the second fixed portion 423 is located on the other side thereof, and the three bonding parts 511, 413a, and 423a are arranged in the Y axis direction and are provided to be adjacent to each other. Thus, it is possible to more effectively reduce a difference between deviations in the movable portion 52 and the fixed electrode 4 in a case where the substrate 2 is warped or bent due to heat, residual stress, or the like, specifically, among deviations in the X axis direction, the Y axis direction, and the Z axis direction between first movable electrode fingers 611 and the first fixed electrode fingers 412, particularly, a difference with the deviation in the Z axis direction, and, among deviations in the X axis direction, the Y axis direction, and the Z axis direction between second movable electrode fingers 621 and the second fixed electrode fingers 422, particularly, a difference with the deviation in the Z axis direction.

As illustrated in FIG. 1, the movable electrode 6 includes a first movable electrode 61 located in the first opening part 528 and a second movable electrode 62 located in the second opening part 529.

The first movable electrode 61 has a plurality of first movable electrode fingers 611 which are located on both sides of the first stem portion 411 in the Y axis direction and extend in the Y axis direction. In other words, the first movable electrode fingers 611 have first movable electrode fingers 611' located on the Y axis direction positive side of the first stem portion 411 and first movable electrode fingers 611" located on the Y axis direction negative side thereof. The first movable electrode fingers 611' and 611" are respectively provided to be separated from each other in a plurality along the X axis direction. The first movable electrode fingers 611' extend from the frame part 521 toward the Y axis direction negative side, and the first movable electrode fingers 611" extend from the first X-axis stem part 523 toward the Y axis direction positive side.

Each of the first movable electrode fingers 611 is located on the X axis direction positive side with respect to the corresponding first fixed electrode finger 412, and faces the first fixed electrode finger 412 with a gap therebetween. An electrostatic capacitor is formed between the first movable electrode finger 611 and the first fixed electrode finger 412 during driving of the physical quantity sensor 1.

Lengths of the plurality of first movable electrode fingers 611' are gradually reduced toward the X axis direction positive side. On the other hand, lengths of the plurality of first movable electrode fingers 611" are gradually increased toward the X axis direction positive side. A total length of the first movable electrode fingers 611' arranged in the Y axis direction is substantially the same as a total length of the first movable electrode fingers 611" arranged in the Y axis direction.

The second movable electrode 62 has a plurality of second movable electrode fingers 621 which are located on both sides of the second stem portion 421 in the Y axis direction and extend in the Y axis direction. In other words, the second movable electrode fingers 621 have second movable electrode fingers 621' located on the Y axis direction positive side of the second stem portion 421 and second movable electrode fingers 621" located on the Y axis direction negative side thereof. The second movable electrode fingers 621' and 621" are respectively provided to be separated from each other in a plurality along the X axis direction. The second movable electrode fingers 621' extend from the second X-axis stem part 525 toward the Y axis direction negative side, and the second movable electrode fingers 621" extend from the frame part 521 toward the Y axis direction positive side.

Each of the second movable electrode finger 621 is located on the X axis direction negative side with respect to the corresponding second fixed electrode finger 422, and faces the second fixed electrode finger 422 with a gap therebetween. An electrostatic capacitor is formed between the second movable electrode finger 621 and the second fixed electrode finger 422 during driving of the physical quantity sensor 1.

Lengths of the plurality of second movable electrode fingers 621' are gradually increased toward the X axis direction positive side. On the other hand, lengths of the plurality of second movable electrode fingers 621" are gradually reduced toward the X axis direction positive side. A total length of the second movable electrode fingers 621' arranged in the Y axis direction is substantially the same as a total length of the second movable electrode fingers 621" arranged in the Y axis direction.

As mentioned above, the sensor element 3 has been described, but a configuration of the sensor element 3 is not particularly limited. For example, each of the first stem portion 411 and the second stem portion 421 may be disposed along the X axis direction. The first fixed electrode fingers 412 may be disposed to extend from the first stem portion 411 toward one side in the Y axis direction. Similarly, the second fixed electrode fingers 422 may be disposed to extend from the second stem portion 421 toward one side in the Y axis direction. One of a set of the first movable electrode 61 and the first fixed electrode 41 and a set of the second movable electrode 62 and the second fixed electrode 42 may be omitted.

During an operation of the physical quantity sensor 1, for example, a voltage V1 in FIG. 4 is applied to the movable electrode 6, and each of the first fixed electrode 41 and the second fixed electrode 42 is connected to a QV amplifier (charge-voltage conversion circuit). An electrostatic capacitor $Ca$ is formed between the first movable electrode finger 611 and the first fixed electrode finger 412, and an electrostatic capacitor $Cb$ is formed between the second movable electrode finger 621 and the second fixed electrode finger 422.

In a case where the acceleration Ax is applied to the physical quantity sensor 1, the movable portion 52 is displaced in the X axis direction while deforming the springs 53 and 54 on the basis of the magnitude of the acceleration Ax. The gap between the first movable electrode finger 611 and the first fixed electrode finger 412 and the gap between the second movable electrode finger 621 and the second fixed electrode finger 422 are changed due to the displacement, and capacitances of the electrostatic capacitors Ca and Cb are changed due to the changes of the gaps. Thus, it is possible to measure the acceleration Ax on the basis of the changes of the capacitances of the electrostatic capacitors Ca and Cb.

In a case where the capacitance of the electrostatic capacitor Ca increases, the capacitance of the electrostatic capacitor Cb decreases, and, conversely, in a case where the capacitance of the electrostatic capacitor Ca decreases, the capacitance of the electrostatic capacitor Cb increases. Thus, noise can be canceled through a differential operation (subtraction process: Ca−Cb) between a detection signal (a signal corresponding to the magnitude of the capacitance of the electrostatic capacitor Ca) obtained from the wire 75 and a detection signal (a signal corresponding to the magnitude of the capacitance of the electrostatic capacitor Cb) obtained from the wire 76, and thus it is possible to measure the acceleration Ax with higher accuracy.

Here, there is a case where an electric field is applied to the substrate 2 during driving of the physical quantity sensor 1, and thus movable ions (Na+) are moved in the substrate 2 such that the bottom surface of the depressed portion 21 is charged. Then, an electrostatic attractive force is generated between the bottom surface of the depressed portion 21 and the movable portion 52, the movable portion 52 is pulled to the substrate 2 side by the electrostatic attractive force, and thus there is concern that an output drift may occur. Therefore, in the present embodiment, as illustrated in FIG. 1, an electrode 771 having the same potential as that of the movable portion 52 is disposed on the bottom surface of the depressed portion 21, so as to overlap at least a part of the movable portion 52 in a plan view from the Z axis direction. Consequently, the influence of charging of the bottom surface of the depressed portion 21 is reduced, and thus the above-described problem hardly occurs. Particularly, in the present embodiment, the electrode 771 is disposed to overlap the substantially entire region of the movable portion 52 in a plan view from the Z axis direction. Thus, the above-described effect is remarkably exhibited. The electrode 771 is formed integrally with the wire 77. Thus, the electrode 771 can be made to have the same potential as that of the movable portion 52 with a simple configuration.

Returning to the description of the substrate 2, as illustrated in FIG. 1, the substrate 2 includes a restriction portion 9 disposed to overlap the movable portion 52. The restriction portion 9 functions as a stopper which restricts displacement of the movable portion 52 toward the Z axis direction negative side. Excessive displacement of the movable portion 52 toward the Z axis direction negative side can be reduced by providing the restriction portion 9, and thus it is possible to reduce that excessive stress is applied to the sensor element 3. Thus, damage of the sensor element 3 is reduced, and thus the physical quantity sensor 1 having high mechanical strength is provided. In a case where the restriction portion 9 is provided, a contact area of when the movable portion 52 is brought into contact with the substrate 2 can be reduced compared with a case where the restriction portion 9 is not provided. Thus, it is possible to effectively reduce the occurrence of so-called "sticking" in which the movable portion 52 is brought into contact with the substrate 2, and is stuck thereto so as not to return to an original state.

As illustrated in FIG. 1, the restriction portion 9 includes a first projection part 91 and a second projection part 92. Each of the first projection part 91 and the second projection part 92 is disposed to overlap the movable portion 52 in a plan view from the Z axis direction. As illustrated in FIGS. 5 and 6, each of the first projection part 91 and the second projection part 92 is disposed to be separated from the movable portion 52. Consequently, it is possible to reduce contact between the first and second projection parts 91 and 92 and the movable portion 52 in a natural state (stoppage state), and thus the movable portion 52 is smoothly displaced in a case where the acceleration Ax is applied. On the other hand, in a case where an acceleration in the Z axis direction is applied, the movable portion 52 can be more reliably brought into contact with the first and second projection parts 91 and 92. Thus, it is possible to reduce excessive displacement of the movable portion 52 toward the Z axis direction negative side, and thus to effectively reduce damage of the sensor element 3 due to the displacement.

Particularly, in the present embodiment, the first projection part 91 and the second projection part 92 are included in the movable portion 52 in a plan view from the Z axis direction. Consequently, it is possible to reduce contact the first projection part 91 and the second projection part 92, and portions other than the movable portion 52. Thus, it is possible to effectively reduce contact between portions having comparatively low rigidity such as the springs 53 and 54 and the first and second projection parts 91 and 92, and thus to effectively reduce damage of the sensor element 3 due to contact with the first and second projection parts 91 and 92.

Here, as illustrated in FIG. 1, the frame part 521 of the movable portion 52 has a first outer edge 521a which is located on the X axis direction positive side of the fixed portion 51 and is disposed along the Y axis direction, and a second outer edge 521b which is located on the X axis direction negative side of the fixed portion 51 and is disposed along the Y axis direction. The first projection part 91 is disposed to overlap the first outer edge 521a in a plan view from the Z axis direction, and the second projection part 92 is disposed to overlap the second outer edge 521b. Consequently, when the movable portion 52 is displaced toward the Z axis direction negative side, both ends of the movable portion 52 in the X axis direction are brought into contact with the first projection part 91 and the second projection part 92, and thus it is possible to effectively reduce a disturbance in an attitude of the movable portion 52 during contact. In other words, unintended stress (stress caused by a disturbance in an attitude) hardly occurs in the sensor element 3 during contact with the restriction portion 9, and damage of the sensor element 3 can be effectively reduced.

As illustrated in FIG. 1, the fixed portion 51 is disposed further toward the second outer edge 521b side than the first outer edge 521a. As a distance to the fixed portion 51 increases, a bending amount generated due to an acceleration in the Z axis direction increases, and thus greater and more powerful displacement occurs in the Z axis direction. In the present embodiment, bending of the beam 59 is applied, and thus the first outer edge 521a is more greatly and powerfully displaced in the Z axis direction than the second outer edge 521b. Thus, the first outer edge 521a collides with the restriction portion 9 more powerfully than the second outer edge 521b. Therefore, in the physical quantity sensor 1, a contact area M1 (an area of an upper surface of the first projection part 91) between the first outer edge 521a and the first projection part 91 is made larger than a contact area M2 (an area of an upper surface of the second projection part 92) between the second outer edge 521b and the second projection part 92. In other words, a relationship of M1>M2 is satisfied.

As mentioned above, since a relationship of M1>M2 is satisfied, the contact area M1 can be sufficiently increased, and thus a contact impact can be distributed. Thus, it is possible to effectively reduce damage (particularly, crack) of the first outer edge 521a or the first projection part 91. On the other hand, since a relationship of M1>M2 is satisfied, the contact area M2 can be sufficiently decreased. As described above, since the second outer edge 521b is not displaced more powerfully than the first outer edge 521a, even if the contact area M2 is smaller than the contact area M1, it is possible to reduce damage (particularly, crack) of the second outer edge 521b or the second projection part 92. Since the contact area M2 is small, it is possible to effectively reduce sticking between the second outer edge 521b and the second projection part 92. In other words, in the physical quantity sensor 1, since appropriate contact areas M1 and M2 are set according to the magnitude of an impact caused by contact with the movable portion 52, a contact area (a total area of the contact areas M1 and M2) of the restriction portion 9 and the movable portion 52 can be minimized, and thus it is possible to realize both a reduction of damage of the movable portion 52 or the restriction portion 9 and a reduction of sticking. Consequently, it is possible to provide the physical quantity sensor 1 having high reliability.

M2/M1 differs depending on a difference between a separation distance between the fixed portion 51 and the first outer edge 521a and a separation distance between the fixed portion 51 and the second outer edge 521b, but is preferably, for example, 0.01 or more and 0.5 or less, and is more preferably 0.03 or more and 0.2 or less. Such a value is taken, and thus the above-described effects can be more remarkably exhibited.

As illustrated in FIGS. 1 and 5, the first projection part 91 has a longitudinal shape along the Y axis direction, and is brought into contact with the substantially entire region of the first outer edge 521a in the longitudinal direction. With this configuration, it is possible to secure the sufficiently large contact area M1 in a simple manner. Since the first projection part 91 is disposed along the Y axis direction, it is possible to effectively reduce a disturbance (particularly, swinging around the X axis) in an attitude of the movable portion 52 when colliding with the first projection part 91.

On the other hand, as illustrated in FIGS. 1 and 6, the second projection part 92 is divided into a plurality of division pieces, and the plurality of division pieces are disposed along the Y axis direction. Specifically, the second projection part 92 has a division piece 921 which is disposed to overlap the Y axis direction center of the second outer edge 521b, a division piece 922 which is disposed to overlap an end of the second outer edge 521b on the Y axis direction positive side, and a division piece 923 which is disposed to overlap an end of the second outer edge 521b on the Y axis direction negative side. The division pieces 921, 922, and 923 are disposed with gaps along the Y axis direction. With this configuration, the contact area M2 can be made smaller than the contact area M1 in a simple manner. Since the division pieces 922 and 923 are disposed to overlap both ends of the second outer edge 521b in the Y axis direction, it is possible to effectively reduce a disturbance (particularly, swinging around the X axis) in an attitude of the movable portion 52 when colliding with the second projection part 92.

Each of a separation distance D1 (refer to FIG. 5) between the movable portion 52 and the first projection part 91 and a separation distance D2 (refer to FIG. 6) between the movable portion 52 and the second projection part 92 is not particularly limited, but is preferably, for example, 1 μm or more and 10 μm or less, and is more preferably 2 μm or more and 5 μm or less. Consequently, it is possible to more relatively reduce contact between the first and second projection parts 91 and 92 and the movable portion 52 in a natural state (stoppage state), and also to rapidly bring the movable portion 52 into contact with the first and second projection parts 91 and 92 when the movable portion 52 is displaced toward the Z axis direction negative side. Thus, it is possible to effectively reduce that excessive stress is applied to the sensor element 3.

The separation distances D1 and D2 may be the same as or different from each other. In other words, a relationship therebetween may be D1=D2, may be D1<D2, and may be D1>D2. However, as described above, the first outer edge 521a is more easily displaced in the Z axis direction than the second outer edge 521b, and thus a relationship of D1<D2 is preferable. Consequently, it is possible to effectively reduce unintended contact between the movable portion 52 and the first projection part 91.

As mentioned above, the physical quantity sensor 1 has been described. As described above, the physical quantity sensor 1 includes the substrate 2, the fixed portion 51 fixed to the substrate 2, the movable portion 52 which has the frame part 521 surrounding the fixed portion 51 in a plan view, and is connected to the fixed portion 51 and is displaceable in the X axis direction (first direction) with respect to the substrate 2, and the movable electrode 6 which is supported at the movable portion 52. The frame part 521 includes the first outer edge 521a which is located on the X axis direction positive side (one side) and is disposed along the Y axis direction (second direction) orthogonal to the X axis direction, and the second outer edge 521b which is located on the X axis direction negative side (the other side) and is disposed along the Y axis direction. The fixed portion 51 is disposed further toward the second outer edge 521b side than the first outer edge 521a. The substrate 2 includes the first projection part 91 which overlaps the first outer edge 521a in a plan view and is disposed to be separated from the first outer edge 521a, and the second projection part 92 which overlaps the second outer edge 521b and is disposed to be separated from the second outer edge 521b. As mentioned above, since the first and second projection parts 91 and 92 are provided, it is possible to reduce excessive displacement of the movable portion 52 toward the Z axis direction negative side and thus to reduce that excessive stress is applied to the sensor element 3. Thus, damage of the sensor element 3 is reduced, and thus the physical quantity sensor 1 having high mechanical strength is provided. In a case where the first and second projection parts 91 and 92 are provided, a contact area of when the movable portion 52 is brought into contact with the substrate 2 can be reduced compared with a case where the first and second projection parts 91 and 92 are not provided. Thus, it is possible to effectively reduce the occurrence of so-called "sticking" in which the movable portion 52 is brought into contact with the substrate 2, and is stuck thereto so as not to return to an original state.

As described above, the movable portion 52 is displaced in the Z axis direction (third direction) orthogonal to the X axis direction and the Y axis direction so as to be brought into contact with the first projection part 91 and the second projection part 92, and the contact area M1 of the movable portion 52 and the first projection part 91 is larger than the contact area M2 of the movable portion 52 and the second projection part 92. As mentioned above, since a relationship of M1>M2 is satisfied, the contact area M1 can be sufficiently increased, and thus a contact impact can be distributed. Thus, it is possible to effectively reduce damage (particularly, crack) of the first outer edge 521a or the first projection part 91. On the other hand, the contact area M2 can be sufficiently decreased. Consequently, it is possible to effectively reduce sticking.

As described above, the first projection part 91 and the second projection part 92 are included in the movable portion 52 in a plan view from the Z axis direction. In other words, each of the first projection part 91 and the second projection part 92 is disposed not to exceed the movable portion 52 in a plan view from the Z axis direction. Consequently, it is possible to reduce contact between the first projection part 91 and the second projection part 92, and portions other than the movable portion 52. Thus, it is possible to effectively reduce contact between portions having comparatively low rigidity such as the springs 53 and 54 and the first and second projection parts 91 and 92, and thus to effectively reduce damage of the sensor element 3 due to contact with the first and second projection parts 91 and 92.

As described above, the substrate 2 includes the electrode 771 which is disposed on a surface (the bottom surface of the depressed portion 21) of the substrate 2 on the movable portion 52 side in at least a part of a region overlapping the movable portion 52. The electrode 771 has the same potential as that of the movable portion 52. Consequently, it is possible to reduce that the movable portion 52 is pulled to the substrate 2 side by an electrostatic attractive force occurring between the substrate 2 and the movable portion 52, and thus to effectively reduce an output drift. Particularly, in the present embodiment, the electrode 771 is also disposed on upper surfaces of the first projection part 91 and the second projection part 92. Since an electrostatic attractive force occurring between the substrate 2 and the movable portion 52 increases as a gap therebetween becomes smaller, the electrode 771 is disposed on the upper surfaces of the first projection part 91 and the second projection part 92 between which a gap is smaller than that between other portions, and thus it is possible to more effectively reduce an output drift.

As described above, the physical quantity sensor 1 is a sensor which can measure acceleration. Consequently, a physical quantity sensor with high convenience is provided.

Second Embodiment

Next, a description will be made of a physical quantity sensor according to a second embodiment.

Figure 7:
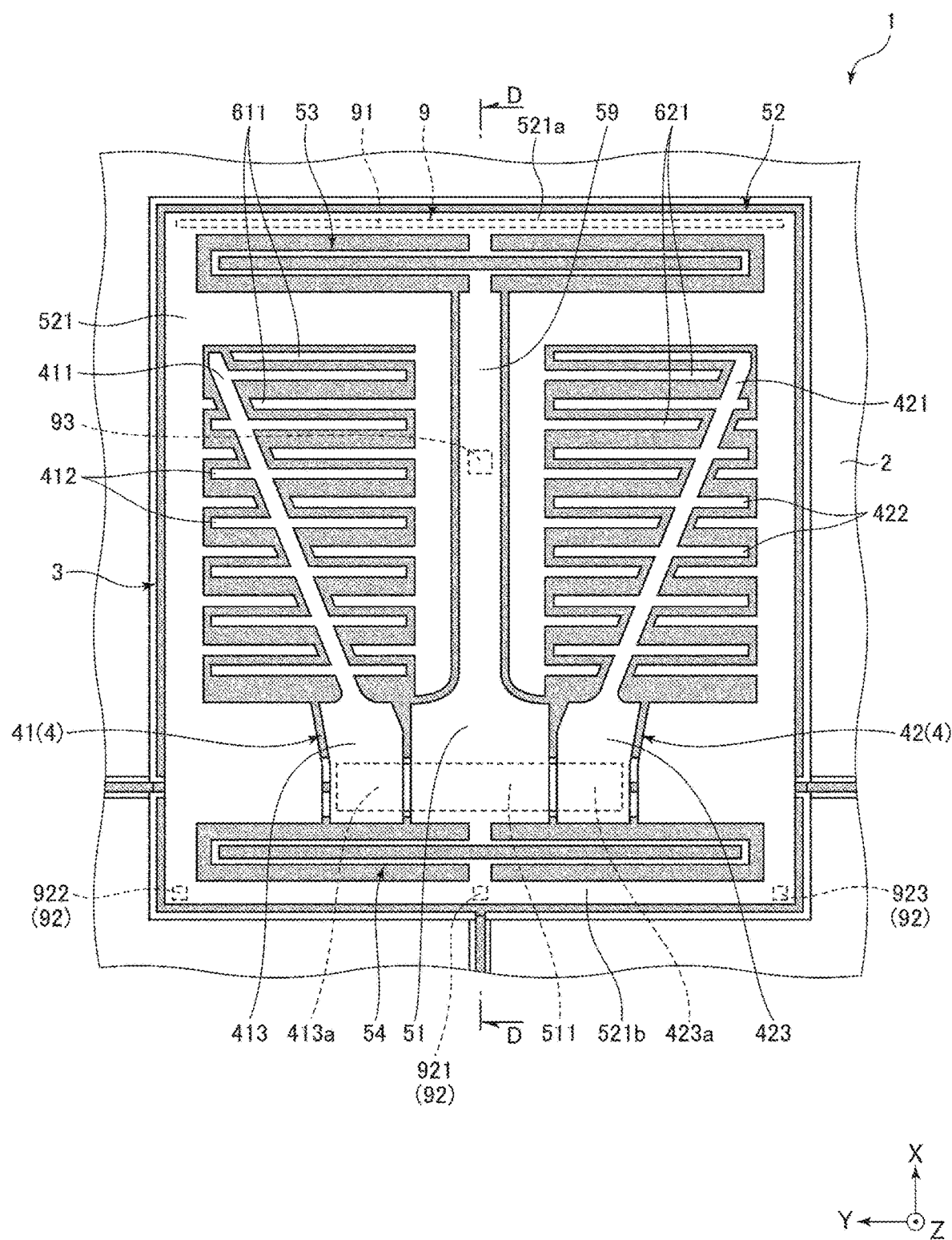
FIG. 7 is a plan view illustrating a physical quantity sensor according to a second embodiment.
Figure 8:
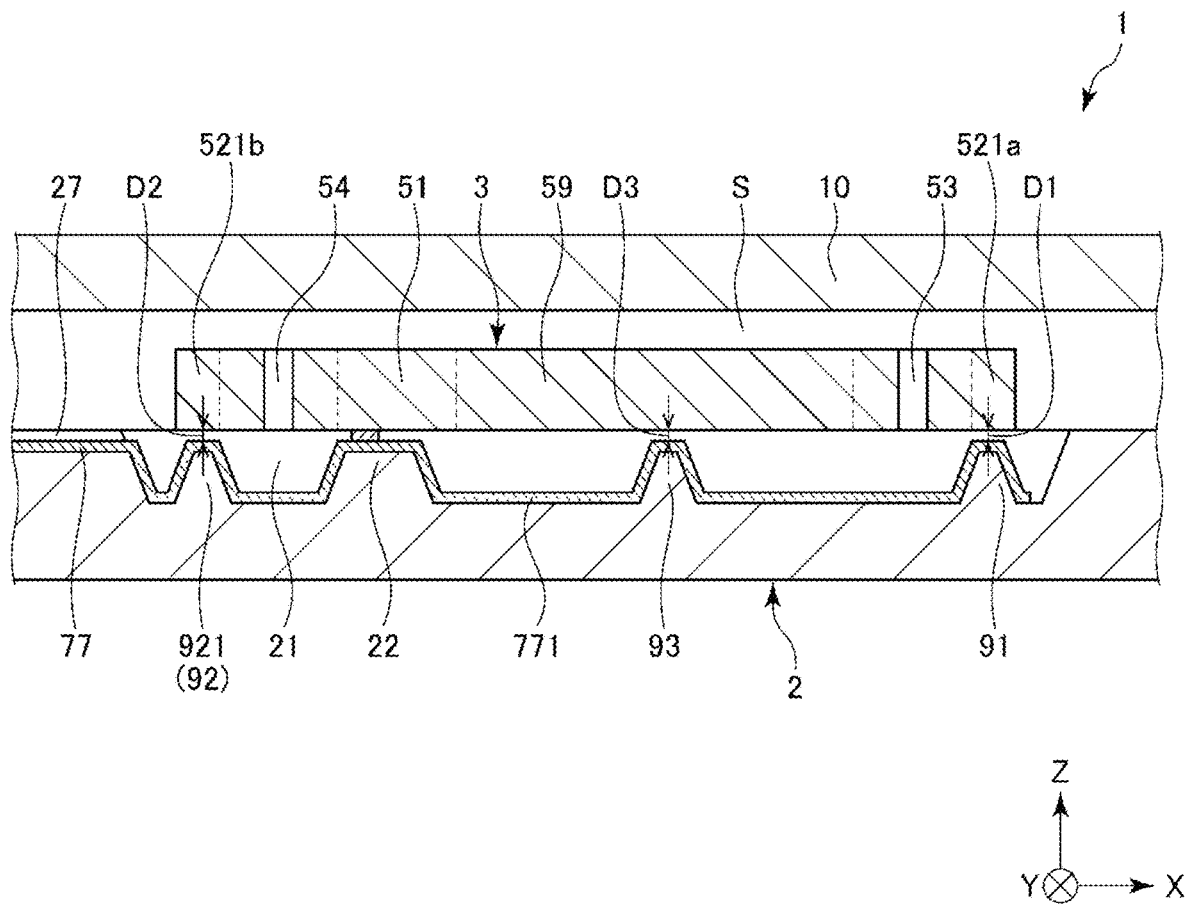
FIG. 8 is a sectional view taken along a line D-D in FIG. 7.
Figure 9:
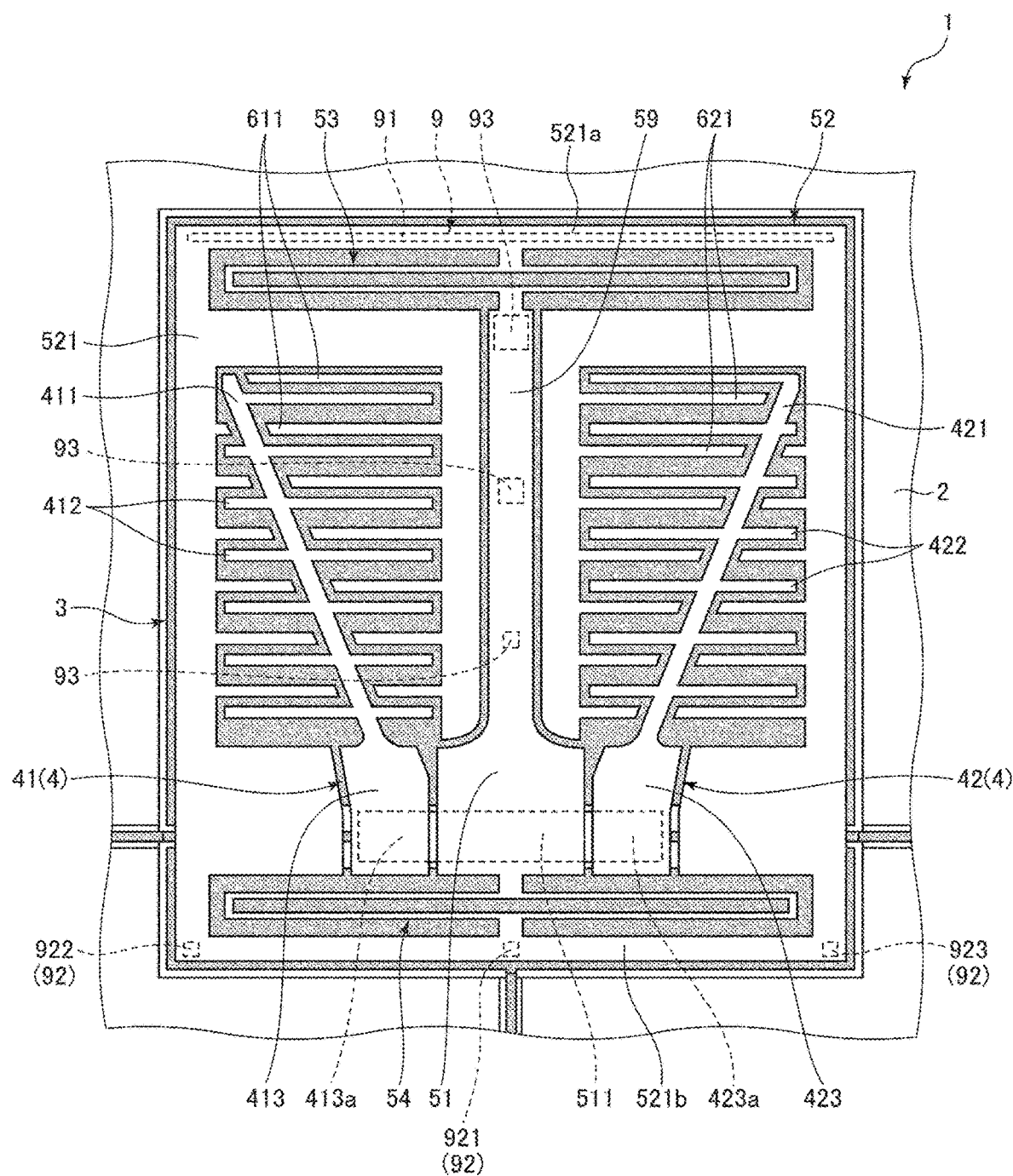
FIG. 9 is a plan view illustrating a modification example of the physical quantity sensor illustrated in FIG. 7.

FIG. 7 is a plan view illustrating a physical quantity sensor according to the second embodiment. FIG. 8 is a sectional view taken along a line D-D in FIG. 7. FIG. 9 is a plan view illustrating a modification example of the physical quantity sensor illustrated in FIG. 7.

A physical quantity sensor 1 according to the present embodiment is the same as the physical quantity sensor 1 of the first embodiment except for a difference in a configuration of the restriction portion 9. In the following description, regarding the physical quantity sensor 1 of the second embodiment, differences from the first embodiment will be focused, and a description of the same contents will be omitted. In FIGS. 7 to 9, the same constituent elements as those in the first embodiment are given the same reference numerals.

As illustrated in FIG. 7, the restriction portion 9 has a third projection part 93 in addition to the first projection part 91 and the second projection part 92. The third projection part 93 is disposed to overlap the beam 59 in a plan view from the Z axis direction. As illustrated in FIG. 8, the third projection part 93 is disposed to be separated from the beam 59. The third projection part 93 is brought into contact with the beam 59 which is bent toward the Z axis direction negative side due to an acceleration being applied, and thus functions as a stopper which restricts bending of the beam 59 more than that. Consequently, it is possible to reduce excessive bending of the beam 59 and thus to reduce damage of the sensor element 3. Bending of the beam 59 is reduced by the third projection part 93, and thus it is possible to suppress displacement of the first outer edge 521a toward the Z axis direction negative side. Thus, it is possible to reduce an impact when the first outer edge 521a is brought into contact with the first projection part 91, and thus to effectively reduce damage of the sensor element 3.

A contact time between the third projection part 93 and the beam 59 is preferably earlier than a contact time between the first projection part 91 and the first outer edge 521a. In other words, preferably, the beam 59 is brought into contact with the third projection part 93 before the first outer edge 521a is brought into contact with the first projection part 91. Consequently, the above-described effect is more remarkably exhibited. However, this is only an example, and a contact time between the third projection part 93 and the beam 59 may be the same as a contact time between the first projection part 91 and the first outer edge 521a, and may be later than a contact time between the first projection part 91 and the first outer edge 521a.

A separation distance D3 (refer to FIG. 8) between the beam 59 and the third projection part 93 is not particularly limited, but is preferably, for example, 1 μm or more and 10 μm or less, and is more preferably 2 μm or more and 5 μm or less. Consequently, it is possible to more relatively reduce contact between the third projection part 93 and the beam 59 in a natural state (stoppage state), and also to rapidly bring the beam 59 into contact with the third projection part 93 when the beam 59 is displaced toward the Z axis direction negative side. Thus, it is possible to effectively reduce that excessive stress is applied to the sensor element 3. The separation distance D3 is preferably shorter than the separation distance D1 between the first outer edge 521a and the first projection part 91. In other words, a relationship of D3<D1 is preferable. Consequently, the beam 59 can be more reliably brought into contact with the third projection part 93 before the first outer edge 521a is brought into contact with the first projection part 91.

The third projection part 93 is located to be closer to the fixed portion 51 than the first projection part 91. Thus, a contact area M3 (an area of an upper surface of the third projection part) of the third projection part 93 and the beam 59 is smaller than the contact area M1 of the first projection part 91 and the first outer edge 521a. Consequently, it is possible to reduce that the contact area M3 is increased more than an area sufficient to resist against an impact, and thus to effectively reduce sticking between the beam 59 and the third projection part 93.

As mentioned above, the physical quantity sensor 1 of the present embodiment has been described. As described above, the physical quantity sensor 1 has a longitudinal shape along the X axis direction (first direction), and includes the beam 59 of which one end is connected to the fixed portion 51, and the spring 53 which connects the other end of the beam 59 to the movable portion 52. The substrate 2 includes the third projection part 93 which overlaps the beam 59 in a plan view, and is disposed to be separated from the beam 59. With this configuration, it is possible to reduce excessive bending of the beam 59 and thus to effectively reduce damage of the sensor element 3.

According to the second embodiment, it is also possible to exhibit the same effects as in the first embodiment. As a modification example of the present embodiment, as illustrated in FIG. 9, the substrate 2 may include a plurality of third projection parts 93. In a configuration illustrated in FIG. 9, the three third projection parts 93 are disposed with gaps in the X axis direction, and, as a distance from the fixed portion 51 becomes longer, a contact area with the beam 59 increases.

Third Embodiment

Next, a physical quantity sensor according to a third embodiment will be described.

Figure 10:
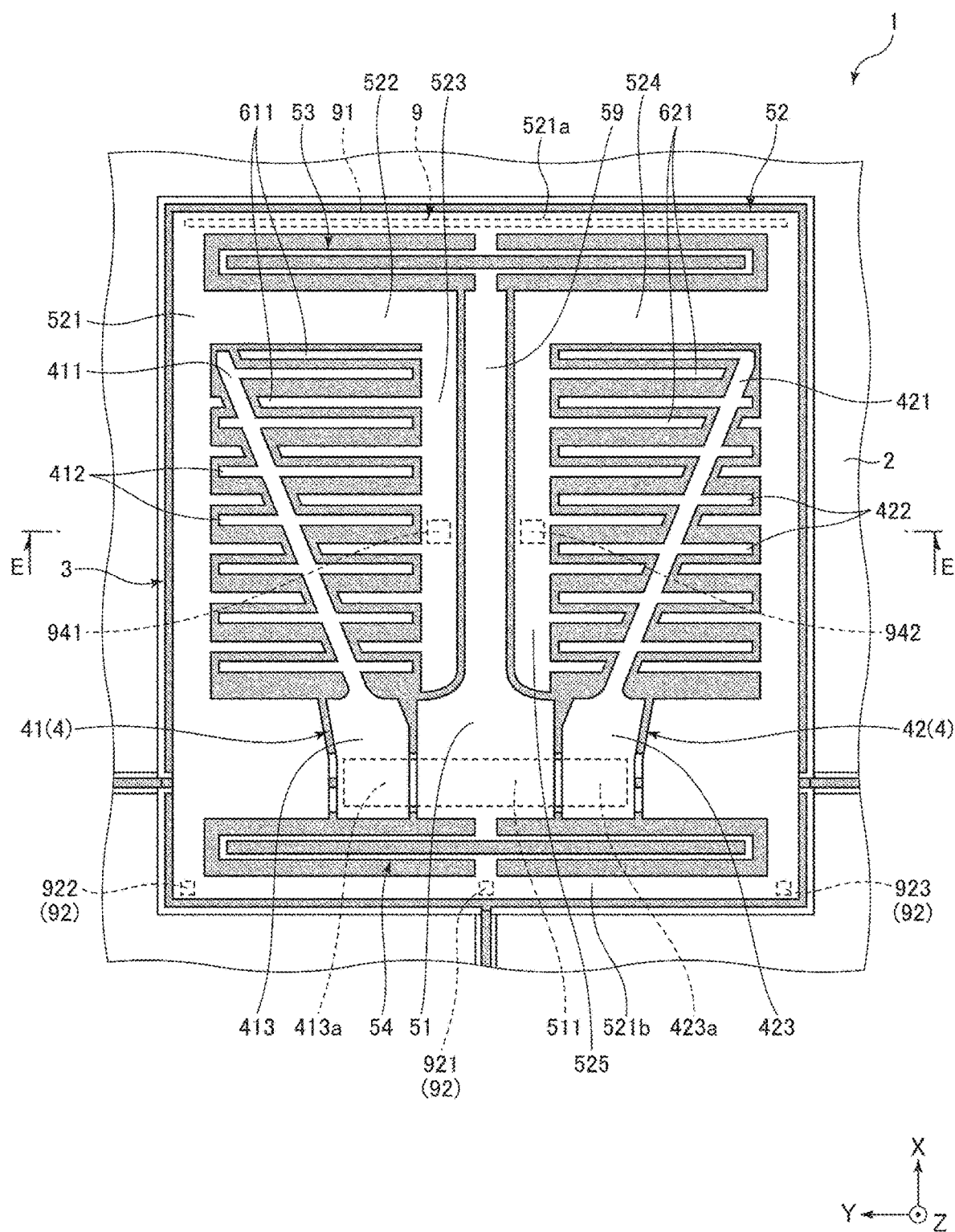
FIG. 10 is a plan view illustrating a physical quantity sensor according to a third embodiment.
Figure 11:
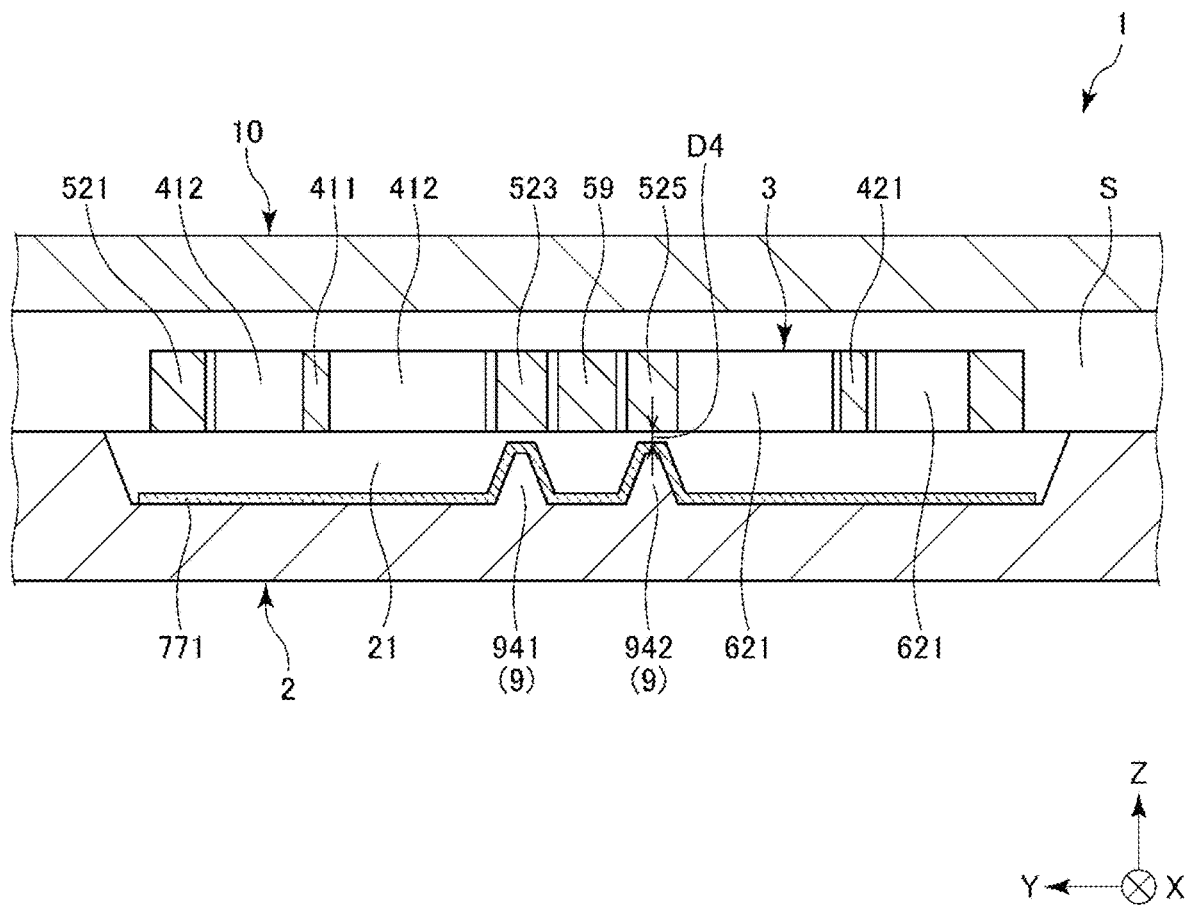
FIG. 11 is a sectional view taken along a line E-E in FIG. 10.
Figure 12:
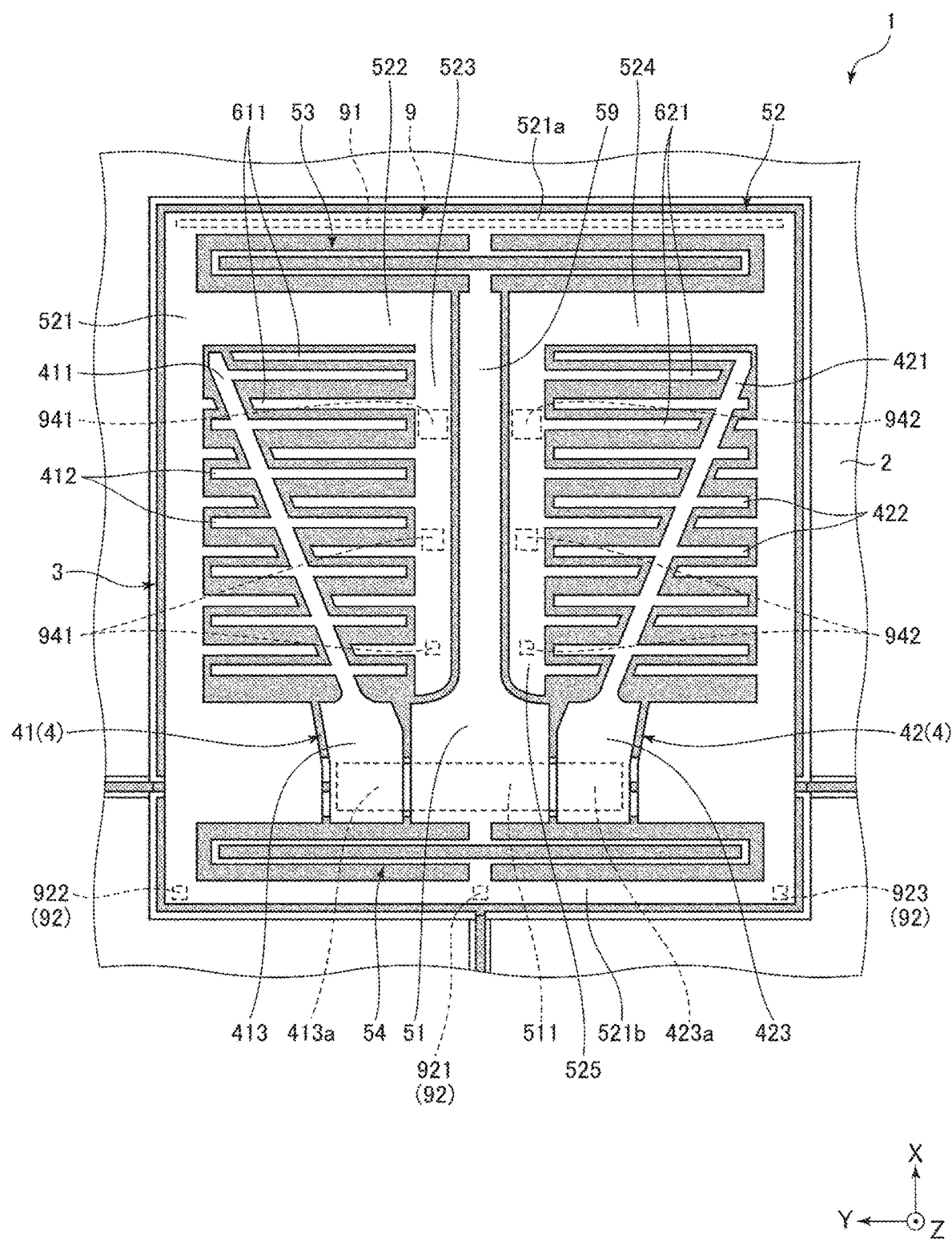
FIG. 12 is a plan view illustrating a modification example of the physical quantity sensor illustrated in FIG. 10.

FIG. 10 is a plan view illustrating a physical quantity sensor according to the third embodiment. FIG. 11 is a sectional view taken along a line E-E in FIG. 10. FIG. 12 is a plan view illustrating a modification example of the physical quantity sensor illustrated in FIG. 10.

A physical quantity sensor 1 according to the present embodiment is the same as the physical quantity sensor 1 of the first embodiment except for a difference in a configuration of the restriction portion 9. In the following description, regarding the physical quantity sensor 1 of the third embodiment, differences from the first embodiment will be focused, and a description of the same contents will be omitted. In FIGS. 10 to 12, the same constituent elements as those in the first embodiment are given the same reference numerals.

As illustrated in FIG. 10, the restriction portion 9 has two fourth projection parts 941 and 942 in addition to the first projection part 91 and the second projection part 92. In a plan view from the Z axis direction, the fourth projection part 941 is disposed to overlap the first X-axis stem part 523 of the movable portion 52, and the fourth projection part 942 is disposed to overlap the second X-axis stem part 525 of the movable portion 52. As illustrated in FIG. 11, the fourth projection part 941 is disposed to be separated from the first X-axis stem part 523, and the fourth projection part 942 is disposed to be separated from the second X-axis stem part 525. The fourth projection parts 941 and 942 are brought into contact with the first and second X-axis stem parts 525 which are bent toward the Z axis direction negative side due to an acceleration being applied, and thus function as a stopper which restricts bending of the movable portion 52 more than that. As mentioned above, the fourth projection parts 941 and 942 are provided in addition to the first projection part 91 and the second projection part 92, and thus the number of contact locations of the restriction portion 9 and the movable portion 52 is increased such that an impact at the time of contact can be distributed. Thus, it is possible to effectively reduce damage of the sensor element 3 due to contact with the restriction portion 9.

Particularly, the first X-axis stem part 523 is a part supported at the frame part 521 in a cantilever manner via the first Y-axis stem part 522, and is thus easily bent in the Z axis direction. Therefore, the fourth projection part 941 is disposed to be brought into contact with the first X-axis stem part 523, and thus it is possible to reduce excessive bending of the first X-axis stem part 523. Similarly, the second X-axis stem part 525 is a part supported at the frame part 521 in a cantilever manner via the second Y-axis stem part 524, and is thus easily bent in the Z axis direction. Therefore, the fourth projection part 942 is disposed to be brought into contact with the second X-axis stem part 525, and thus it is possible to reduce excessive bending of the second X-axis stem part 525. Thus, it is possible to reduce damage of the sensor element 3.

A separation distance D4 between the first and second X-axis stem parts 523 and 525 and the fourth projection parts 941 and 942 is not particularly limited, but is preferably, for example, 1 μm or more and 10 μm or less, and is more preferably 2 μm or more and 5 μm or less. Consequently, it is possible to more relatively reduce contact between the fourth projection parts 941 and 942 and the first and second X-axis stem parts 523 and 525 in a natural state (stoppage state), and also to rapidly bring the first and second X-axis stem parts 523 and 525 into contact with the fourth projection parts 941 and 942 when the first and second X-axis stem parts 523 and 525 are displaced toward the Z axis direction negative side. Thus, it is possible to effectively reduce that excessive stress is applied to the sensor element 3.

The separation distance D4 is not particularly limited, and may be at least one of the separation distances D1 and D2. The separation distance D4 may be longer or shorter than one of the separation distances D1 and D2, and may be longer than one of the separation distances D1 and D2 and may be shorter than the other thereof.

The fourth projection parts 941 and 942 are located to be closer to the fixed portion 51 than the first projection part 91. Thus, each of a contact area M41 (an area of an upper surface of the fourth projection part 941) of the first X-axis stem part 523 and the fourth projection part 941 and a contact area M42 (an area of an upper surface of the fourth projection part 942) of the fourth projection part 942 and the second X-axis stem part 525 is smaller than the contact area M1 of the first projection part 91 and the first outer edge 521a. Consequently, it is possible to reduce that the contact areas M41 and M42 are increased more than an area sufficient to resist against an impact, and thus to effectively reduce sticking between the fourth projection parts 941 and 942 and the first and second X-axis stem parts 523 and 525.

As mentioned above, the physical quantity sensor 1 of the present embodiment has been described. As described above, in the physical quantity sensor 1, the movable portion 52 includes the first and second X-axis stem parts 523 and 525 (step parts) which are located inside the frame part 521 and have a longitudinal shape along the X axis direction in a plan view. The substrate 2 includes the fourth projection parts 941 and 942 which overlap the first and second X-axis stem parts 523 and 525 in a plan view, and are disposed to be separated from the first and second X-axis stem parts 523 and 525. With this configuration, the number of contact locations of the restriction portion 9 and the movable portion 52 is increased, and thus an impact at the time of contact can be distributed. Thus, it is possible to effectively reduce damage of the sensor element 3 due to contact with the restriction portion 9.

According to the third embodiment, it is also possible to exhibit the same effects as in the first embodiment. As a modification example of the present embodiment, as illustrated in FIG. 12, the substrate 2 may include a plurality of fourth projection parts 941 and 942. In a configuration illustrated in FIG. 12, the three fourth projection parts 941 are disposed with gaps in the X axis direction, and, as a distance from the fixed portion 51 becomes longer, a contact area with the first X-axis stem part 523 increases. Similarly, the three fourth projection parts 942 are disposed with gaps in the X axis direction, and, as a distance from the fixed portion 51 becomes longer, a contact area with the second X-axis stem part 525 increases.

Fourth Embodiment

Next, a description will be made of a physical quantity sensor device according to a fourth embodiment.

Figure 13:
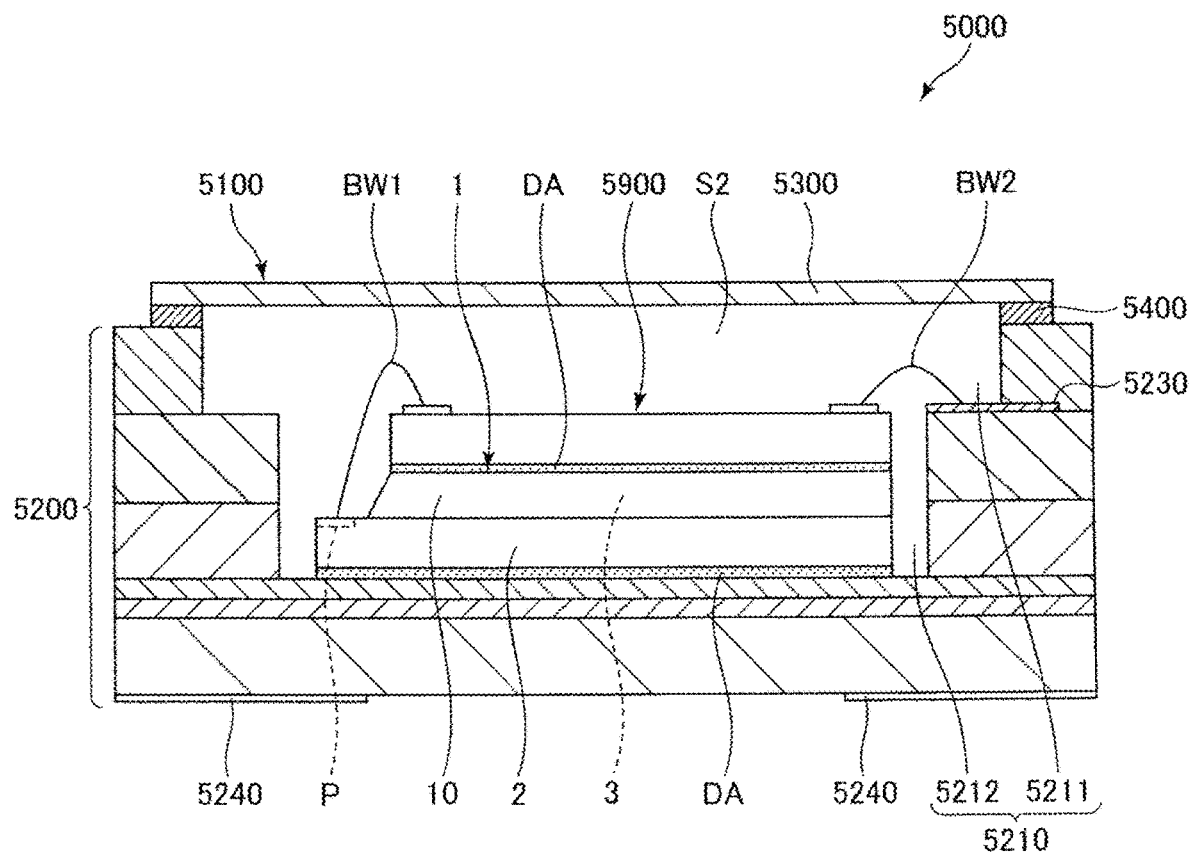
FIG. 13 is a sectional view illustrating a physical quantity sensor device according to a fourth embodiment.

FIG. 13 is a sectional view illustrating a physical quantity sensor device according to the fourth embodiment.

As illustrated in FIG. 13, a physical quantity sensor device 5000 includes the physical quantity sensor 1, a semiconductor element 5900 (circuit element), and a package 5100 storing the physical quantity sensor 1 and the semiconductor element 5900. As the physical quantity sensor 1, any physical quantity sensor of the above-described embodiments may be used.

The package 5100 includes a cavity-like base 5200, and a lid 5300 bonded to an upper surface of the base 5200. The base 5200 has a depressed portion 5210 which is open to the upper surface. The depressed portion 5210 includes a first depressed part 5211 which is open to the upper surface of the base 5200 and a second depressed part 5212 which is open to a bottom surface of the first depressed part 5211.

On the other hand, the lid 5300 has a tabular shape, and is bonded to the upper surface of the base 5200 so as to close the opening of the depressed portion 5210. As mentioned above, the opening of the depressed portion 5210 is closed by the lid 5300, so that a storage space S2 is formed in the package 5100, and the physical quantity sensor 1 and the semiconductor element 5900 are stored in the storage space S2. A method of bonding the base 5200 to the lid 5300 is not particularly limited, and, in the present embodiment, seam welding using a seam ring 5400 is used.

The storage space S2 is air-tightly sealed. An atmosphere of the storage space S2 is not particularly limited, and is preferably the same as, for example, an atmosphere of the storage space S of the physical quantity sensor 1. Consequently, even if the airtightness of the storage space S is broken, and thus the storage spaces S and S2 communicate with each other, the atmosphere of the storage space S can be maintained without any change. Thus, it is possible to reduce a change in a measurement characteristic of the physical quantity sensor 1 due to a change in the atmosphere of the storage space S, and thus to exhibit a stable measurement characteristic.

A constituent material of the base 5200 is not particularly limited, and various ceramics such as alumina, zirconia, or titania may be used. A constituent material of the lid 5300 is not particularly limited, and a member having a linear expansion coefficient similar to that of a constituent material of the base 5200 may be used. For example, in a case where the above-described ceramic is used as a constituent material of the base 5200, an alloy such as Kovar is preferably used.

The base 5200 includes a plurality of internal terminals 5230 disposed in the storage space S2 (a bottom surface of the first depressed part 5211) and a plurality of external terminals 5240 disposed on a bottom surface thereof. Each internal terminal 5230 is electrically connected to a predetermined external terminal 5240 via an internal wire (not illustrated) disposed in the base 5200.

The physical quantity sensor 1 is fixed to the bottom surface of the depressed portion 5210 via a die attach material DA, and the semiconductor element 5900 is disposed on the upper surface of the physical quantity sensor 1 via the die attach material DA. The physical quantity sensor 1 is electrically connected to the semiconductor element 5900 via a bonding wire BW1, and the semiconductor element 5900 is electrically connected to the internal terminals 5230 via a bonding wire BW2.

The semiconductor element 5900 includes, as necessary, for example, a drive circuit which applies a drive voltage to the sensor element 3, a measurement circuit which measures the acceleration Ax on the basis of an output from the sensor element 3, and an output circuit which converts a signal from the measurement circuit into a predetermined signal which is then output.

As mentioned above, the physical quantity sensor device 5000 has been described. The physical quantity sensor device 5000 includes the physical quantity sensor 1 and the semiconductor element 5900 (circuit element). Thus, it is possible to achieve the effect of the physical quantity sensor 1, and thus to provide the physical quantity sensor device 5000 with high reliability.

Fifth Embodiment

Next, a description will be made of a composite sensor device according to a fifth embodiment.

Figure 14:
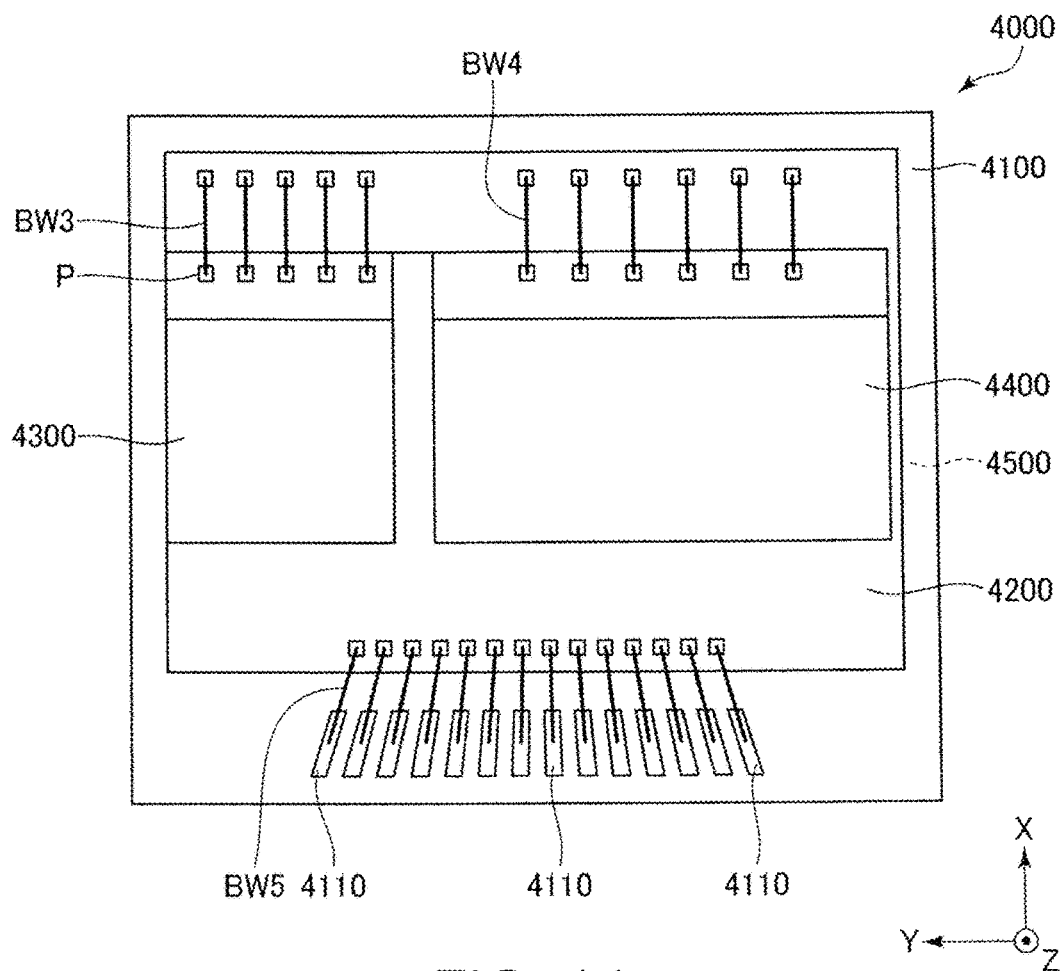
FIG. 14 is a plan view illustrating a composite sensor device according to a fifth embodiment.
Figure 15:
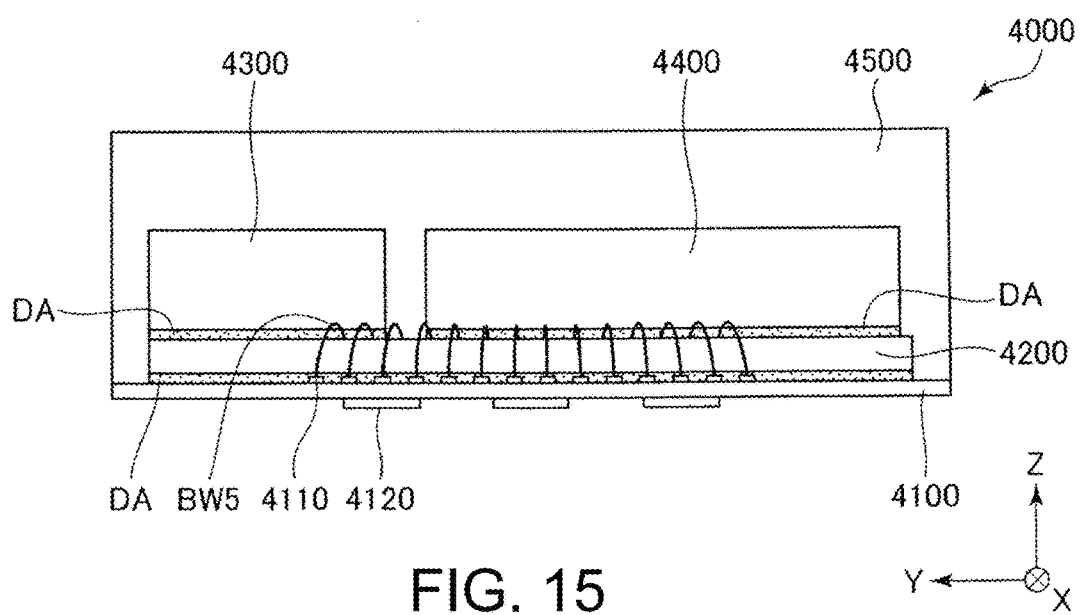
FIG. 15 is a sectional view of the composite sensor device illustrated in FIG. 14.

FIG. 14 is a plan view illustrating a composite sensor device according to the fifth embodiment. FIG. 15 is a sectional view of the composite sensor device illustrated in FIG. 14.

As illustrated in FIGS. 14 and 15, a composite sensor device 4000 includes a base substrate 4100, a semiconductor element 4200 (circuit element) attached to an upper surface of the base substrate 4100 via a die attach material DA (resin adhesive), an acceleration sensor 4300 (first physical quantity sensor) and an angular velocity sensor 4400 (second physical quantity sensor) attached to an upper surface of the semiconductor element 4200 via a die attach material, and a resin package 4500 covering the semiconductor element 4200, the acceleration sensor 4300, and the angular velocity sensor 4400. The acceleration sensor 4300 is a three-axis acceleration sensor which can separately measure accelerations in three axes (the X axis, the Y axis, and the Z axis) orthogonal to each other. The angular velocity sensor 4400 is a three-axis angular velocity sensor which can separately measure angular velocities in three axes (the X axis, the Y axis, and the Z axis) orthogonal to each other. The physical quantity sensor of the present embodiment may be used as the acceleration sensor 4300 and the angular velocity sensor 4400.

The base substrate 4100 is provided with a plurality of connection terminals 4110 on an upper surface thereof, and is provided with a plurality of external terminals 4120 on a lower surface thereof. Each connection terminal 4110 is electrically connected to a corresponding external terminal 4120 via an internal wire or the like (not illustrated) disposed in the base substrate 4100. The semiconductor element 4200 is disposed on the upper surface of the base substrate 4100.

The semiconductor element 4200 includes, as necessary, for example, a drive circuit which drives the acceleration sensor 4300 and the angular velocity sensor 4400, an acceleration measurement circuit which separately measures an acceleration in the X axis direction, an acceleration in the Y axis direction, and an acceleration in the Z axis direction on the basis of outputs from the acceleration sensor 4300, an angular velocity measurement circuit which separately measures an angular velocity about the X axis, an angular velocity about the Y axis, and an angular velocity about the Z axis on the basis of outputs from the angular velocity sensor 4400, and an output circuit which converts a signal from each of the acceleration measurement circuit and the angular velocity measurement circuit into a predetermined signal which is then output.

The semiconductor element 4200 is electrically connected to the acceleration sensor 4300 via bonding wires BW3, electrically connected to the angular velocity sensor 4400 via bonding wires BW4, and electrically connected to the connection terminals 4110 of the base substrate 4100 via bonding wires BW5. The acceleration sensor 4300 and the angular velocity sensor 4400 are disposed side by side on the upper surface of the semiconductor element 4200.

As mentioned above, the composite sensor device 4000 has been described. As described above, the composite sensor device 4000 includes the acceleration sensor 4300 (first physical quantity sensor), and the angular velocity sensor 4400 (second physical quantity sensor) which measures a physical quantity which is different from that of the acceleration sensor 4300. Consequently, it is possible to provide the composite sensor device 4000 which can measure different kinds of physical quantities and thus has high convenience. Particularly, in the present embodiment, the first physical quantity sensor is the acceleration sensor 4300 which measures accelerations, and the second physical quantity sensor is the angular velocity sensor 4400 which measures angular velocities. Thus, for example, it is possible to provide the composite sensor device 4000 which may be used for a motion sensor and thus has considerably high convenience.

Disposition of the acceleration sensor 4300 and the angular velocity sensor 4400 is not particularly limited, and, for example, the acceleration sensor 4300 and the angular velocity sensor 4400 may be attached to the upper surface of the base substrate 4100 with the semiconductor element 4200 interposed therebetween. With this configuration, it is possible to reduce a height of the composite sensor device 4000.

Sixth Embodiment

Next, a description will be made of an inertial measurement unit according to a sixth embodiment.

Figure 16:
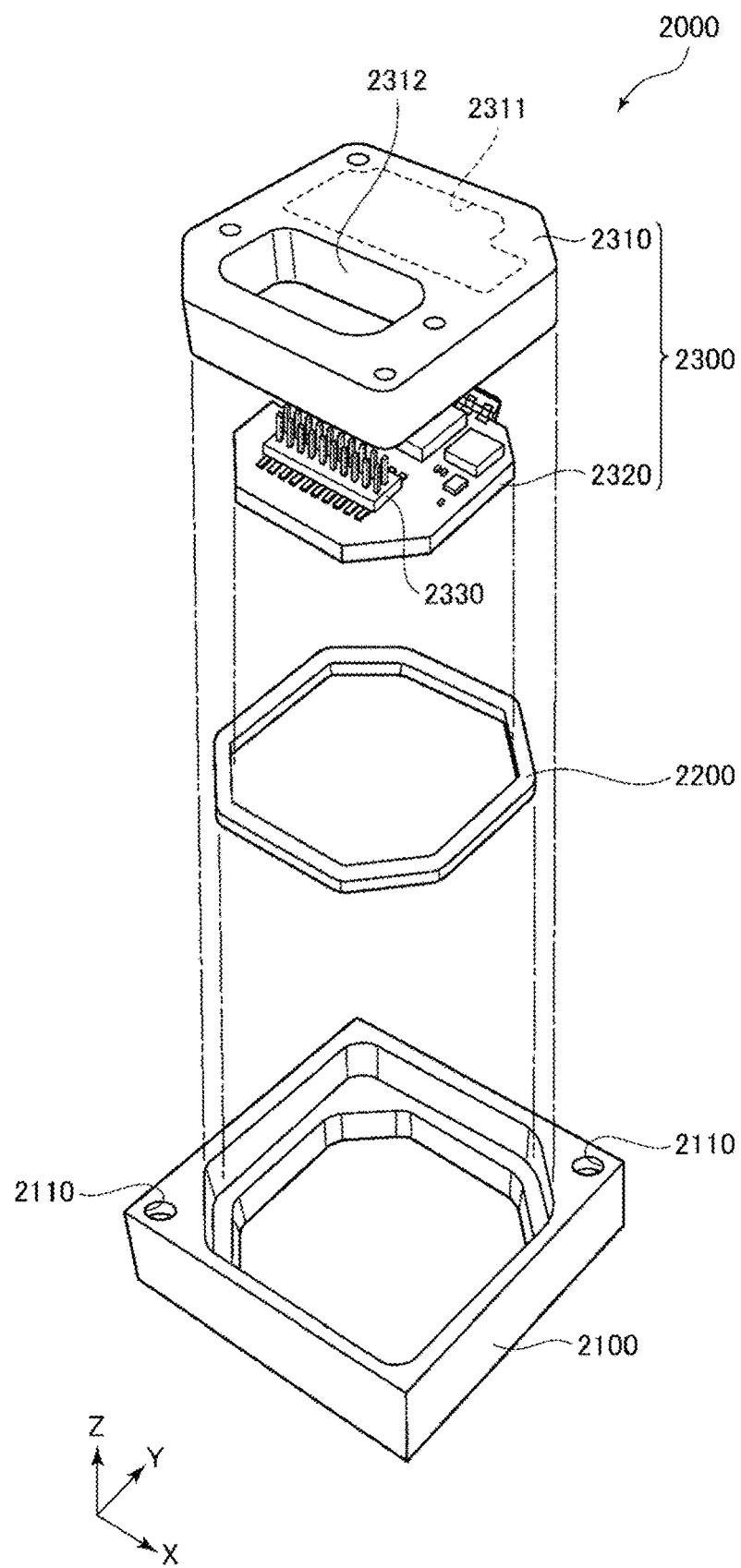
FIG. 16 is an exploded perspective view illustrating an inertial measurement unit according to a sixth embodiment.
Figure 17:
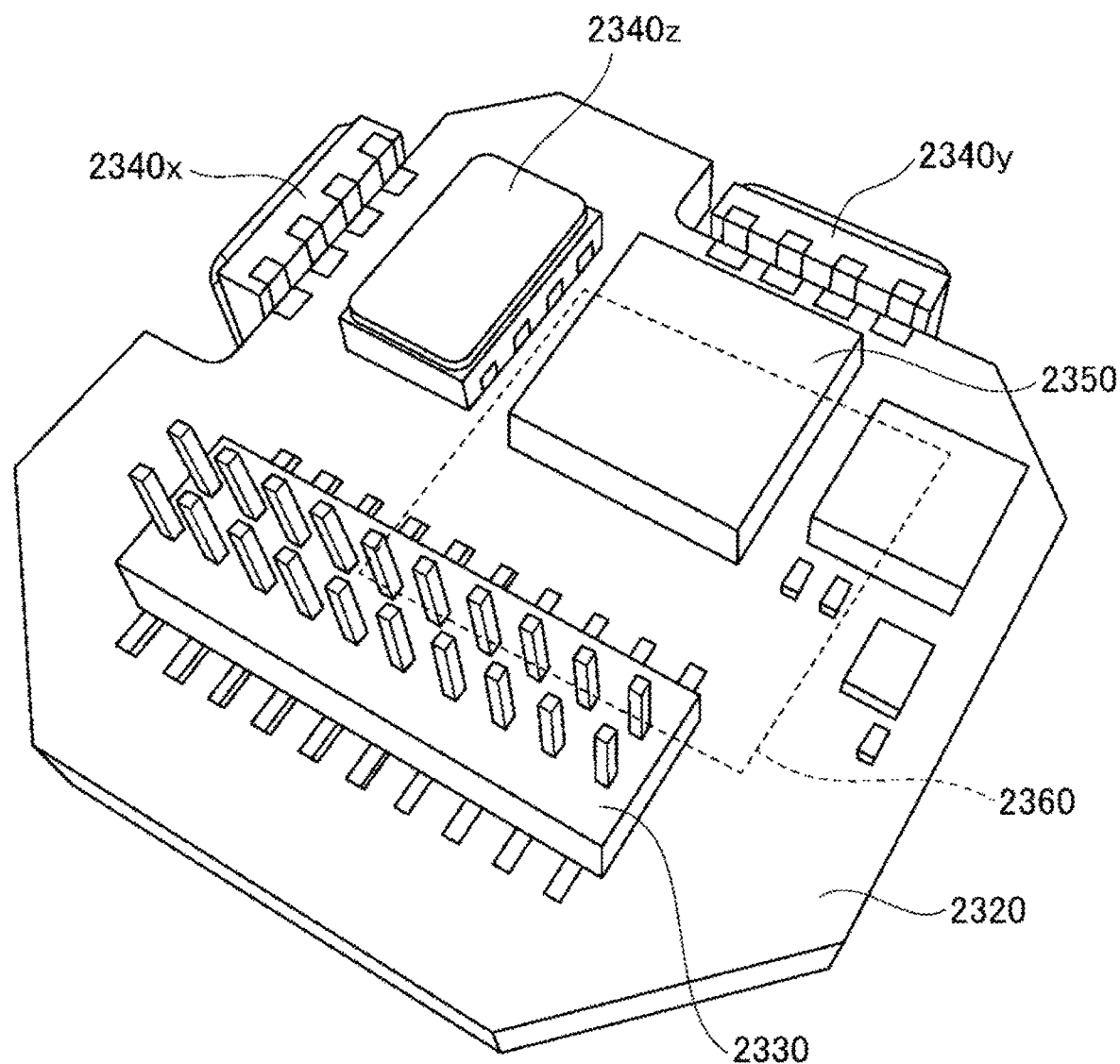
FIG. 17 is a perspective view of a substrate of the inertial measurement unit illustrated in FIG. 16.

FIG. 16 is an exploded perspective view illustrating an inertial measurement unit according to the sixth embodiment. FIG. 17 is a perspective view of a substrate of the inertial measurement unit illustrated in FIG. 16.

An inertial measurement unit (IMU) 2000 illustrated in FIG. 16 is an inertial measurement unit which detects an attitude or a behavior (moment of inertia) of a motion object (mounting apparatus) such as an automobile or a robot. The inertial measurement unit 2000 functions as a so-called six-axis motion sensor including a three-axis acceleration sensor and a three-axis angular velocity sensor.

The inertial measurement unit 2000 is a cuboid of which a planner shape is substantially a square shape. Screw holes 2110 as fixation parts are formed near two vertexes located in a diagonal direction of the square shape. The inertial measurement unit 2000 may be mounted to a mounting surface of a mounting object such as an automobile by inserting two screws into the two screw holes 2110. The inertial measurement unit 2000 may be reduced to a size so as to be mountable on, for example, a smart phone or a digital camera through selection of components or a design change.

The inertial measurement unit 2000 includes an outer case 2100, a bonding member 2200, and a sensor module 2300, and has a configuration in which the sensor module 2300 is inserted into the outer case 2100 via the bonding member 2200. The sensor module 2300 has an inner case 2310 and a substrate 2320.

An outer shape of the outer case 2100 is a cuboidal shape of which a planar shape is a square shape in the same manner as the entire shape of the inertial measurement unit 2000, and the screw holes 2110 are formed near two vertexes located in the diagonal direction of the square. The outer case 2100 has a box shape, and stores the sensor module 2300 therein.

The inner case 2310 is a member supporting the substrate 2320, and has a shape accommodated inside the outer case 2100. The inner case 2310 is provided with a depressed portion 2311 for preventing contact with the substrate 2320 or an opening 2312 for exposing a connector 2330 which will be described later. The inner case 2310 is bonded to the outer case 2100 via the bonding member 2200 (for example, a packing impregnated with an adhesive). A lower surface of the inner case 2310 is bonded to the substrate 2320 via an adhesive.

As illustrated in FIG. 17, the connector 2330, an angular velocity sensor 2340z measuring an angular velocity about the Z axis, an acceleration sensor 2350 measuring an acceleration in each of the X axis direction, the Y axis direction, and the Z axis direction, and the like are mounted on an upper surface of the substrate 2320. An angular velocity sensor 2340x measuring an angular velocity about the X axis, and an angular velocity sensor 2340y measuring an angular velocity about the Y axis are mounted on a side surface of the substrate 2320. The physical quantity sensor of the present embodiment may be used as the sensors 2340z, 2340x, 2340y, and 2350.

A control IC 2360 is mounted on a lower surface of the substrate 2320. The control IC 2360 is a micro controller unit (MCU), has a storage section including a nonvolatile memory or an A/D converter built thereinto, and controls each element of the inertial measurement unit 2000. The storage section stores a program for defining an order and contents for measuring acceleration and angular velocity, a program for digitalizing measured data to be incorporated into packet data, accompanying data, and the like. A plurality of other electronic components are mounted on the substrate 2320.

As mentioned above, the inertial measurement unit 2000 has been described. As described above, the inertial measurement unit 2000 includes angular velocity sensors 2340z, 2340x, and 2340y, and the acceleration sensor 2350 as physical quantity sensors, and the control IC 2360 (control circuit) controlling driving of the sensors 2340z, 2340x, 2340y, and 2350. Consequently, it is possible to achieve the effect of the physical quantity sensor, and thus to provide the inertial measurement unit 2000 with high reliability.

Seventh Embodiment

Next, a description will be made of a vehicle positioning apparatus according to a seventh embodiment.

Figure 18:
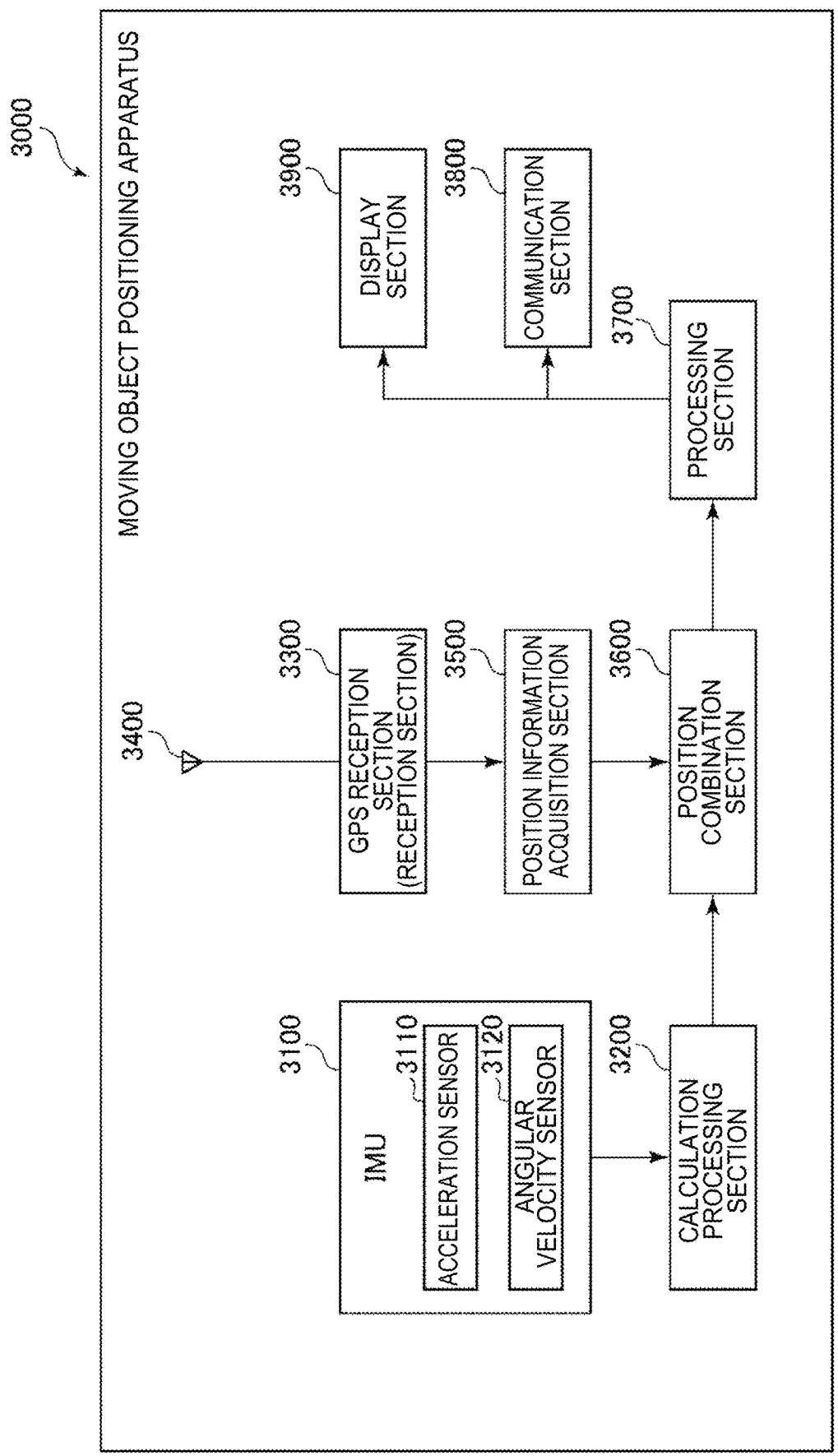
FIG. 18 is a block diagram illustrating the entire system of a vehicle positioning apparatus according to a seventh embodiment.
Figure 19:
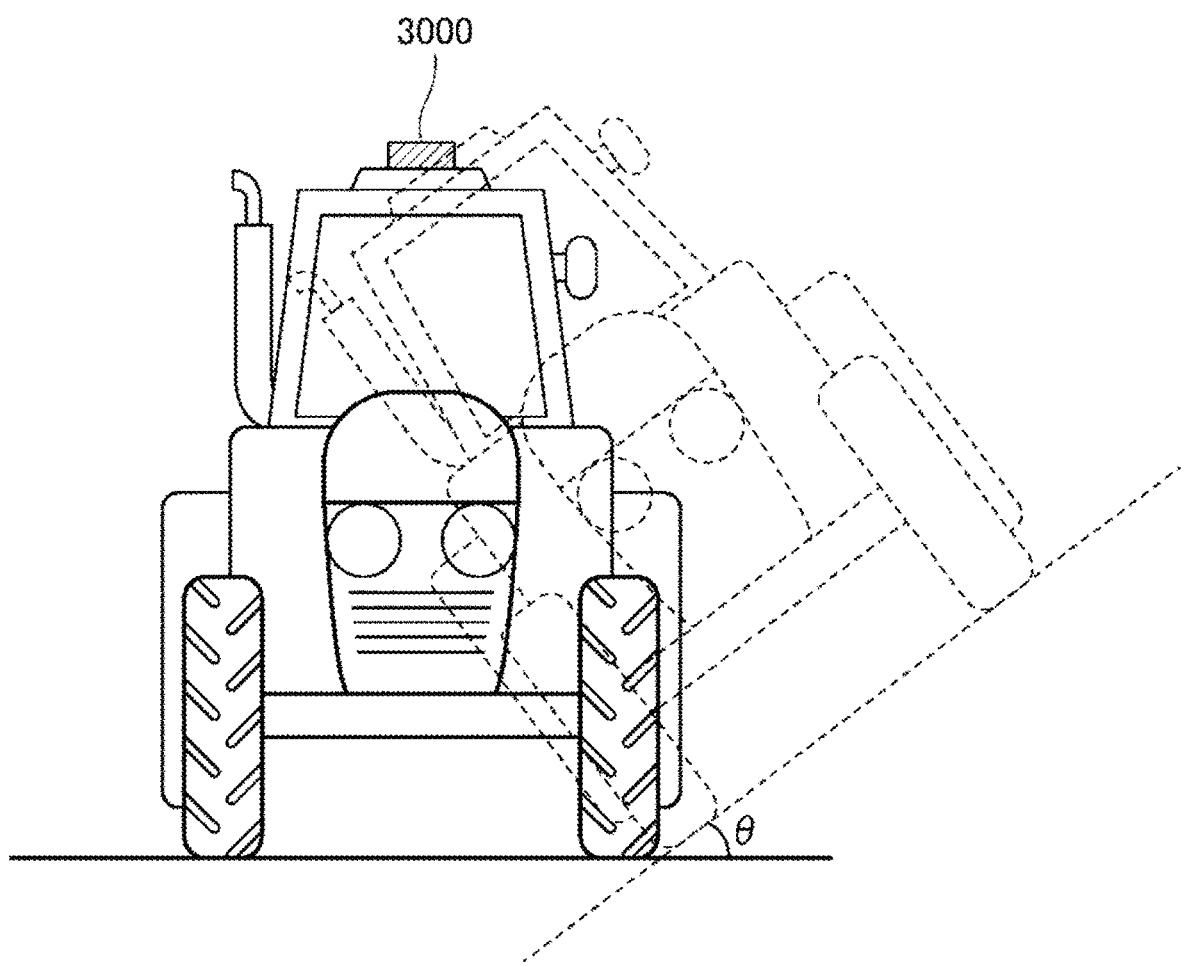
FIG. 19 is a diagram illustrating an operation of the vehicle positioning apparatus illustrated in FIG. 18.

FIG. 18 is a block diagram illustrating the entire system of a vehicle positioning apparatus according to the seventh embodiment. FIG. 19 is a diagram illustrating an operation of the vehicle positioning apparatus illustrated in FIG. 18.

A vehicle positioning apparatus 3000 illustrated in FIG. 18 is an apparatus which is mounted on a vehicle and is used to perform positioning of the vehicle. A vehicle is not particularly limited, and may be any of a bicycle, an automobile (including a four-wheeled vehicle and a motorcycle), an electric train, an airplane, and a ship, and, in the present embodiment, a four-wheeled vehicle will be described. The vehicle positioning apparatus 3000 includes an inertial measurement unit (IMU) 3100, a calculation processing section (calculation processor) 3200, a GPS reception section 3300, a reception antenna 3400, a position information acquisition section 3500, a position combination section 3600, a processing section (processor) 3700, a communication section 3800, and a display section 3900. The inertial measurement unit 2000 may be used as the inertial measurement unit 3100.

The inertial measurement unit 3100 includes a three-axis acceleration sensor 3110 and a three-axis angular velocity sensor 3120. The calculation processing section 3200 receives acceleration data from the acceleration sensor 3110 and receives angular velocity data from the angular velocity sensor 3120, performs inertial navigation calculation process on the data, and outputs inertial navigation positioning data (data including acceleration and an attitude of the vehicle).

The GPS reception section 3300 receives a signal (a GPS carrier wave; a satellite signal on which position information is superimposed) from a GPS satellite via the reception antenna 3400.

The position information acquisition section 3500 outputs GPS positioning data indicating a position (latitude, longitude, and altitude), velocity, and an azimuth of the vehicle positioning apparatus 3000 (vehicle) on the basis of the signal received by the GPS reception section 3300. The GPS positioning data includes status data indicating a reception state, a reception time, and the like.

The position combination section 3600 calculates a position of the vehicle, specifically, a position where the vehicle is traveling on the ground on the basis of the inertial navigation positioning data output from the calculation processing section 3200 and the GPS positioning data output from the position information acquisition section 3500. For example, in a case where positions of the vehicle included in the GPS positioning data are the same as each other, but attitudes of the vehicle are different from each other due to the influence of an inclination of the ground, the vehicle travels at different positions on the ground, as illustrated in FIG. 19. Thus, an accurate position of the vehicle cannot be calculated by using only the GPS positioning data. Therefore, the position combination section 3600 calculates a position where the vehicle travels on the ground by using the inertial navigation positioning data (particularly, data regarding an attitude of the vehicle). The determination can be relatively easily performed through calculation using a trigonometric function (an inclination $\theta$ for a vertical direction).

Position data output from the position combination section 3600 is subjected to a predetermined process in the processing section 3700, and is displayed on the display section 3900 as a positioning result. The position data may be transmitted to an external apparatus via the communication section 3800.

As mentioned above, the vehicle positioning apparatus 3000 has been described. As described above, the vehicle positioning apparatus 3000 includes the inertial measurement unit 3100, the GPS reception section 3300 (reception section) which receives a satellite signal on which position information is superimposed from a positioning satellite, the position information acquisition section 3500 (acquisition section) which acquires position information of the GPS reception section 3300 on the basis of the received satellite signal, the calculation processing section 3200 (operating section) which calculates an attitude of a vehicle on the basis of inertial navigation positioning data (inertial data) output from the inertial measurement unit 3100, and the position combination section 3600 (calculation section) which calculates a position of the vehicle by correcting the position information on the basis of the calculated attitude. Consequently, it is possible to achieve the effect of the inertial measurement unit 2000 and thus to provide the vehicle positioning apparatus 3000 with high reliability.

Eighth Embodiment

Next, a description will be made an electronic apparatus according to an eighth embodiment.

Figure 20:
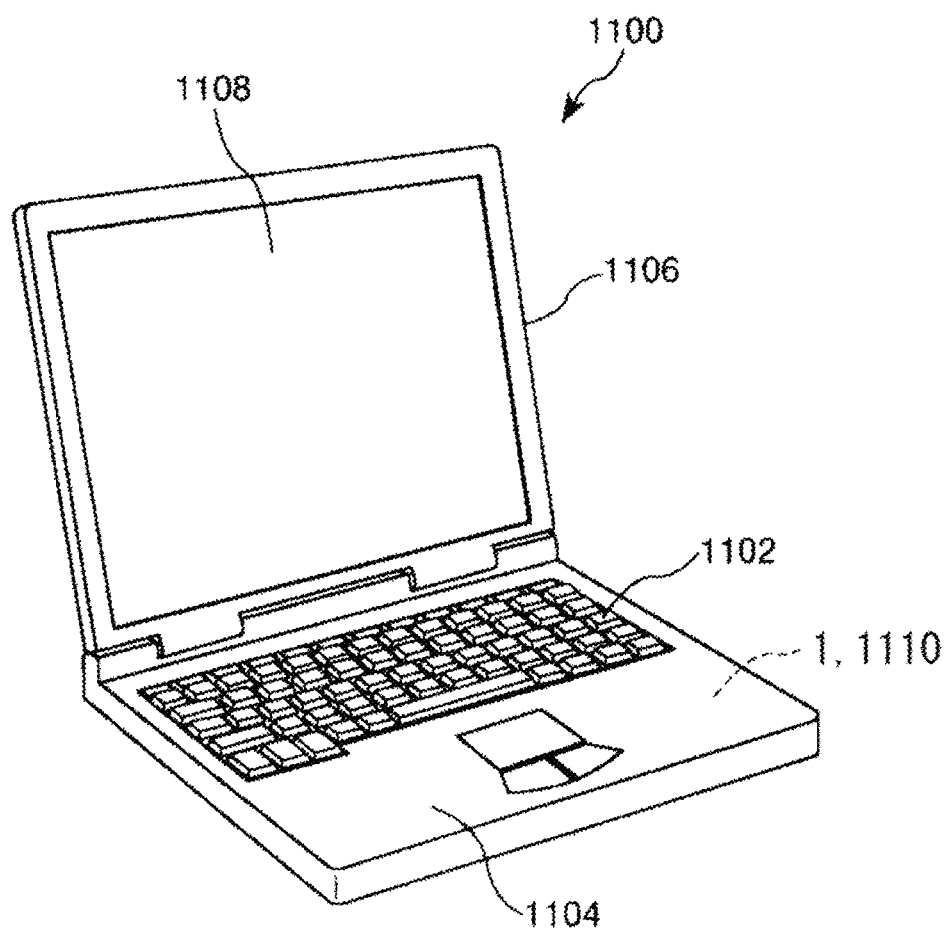
FIG. 20 is a perspective view illustrating an electronic apparatus according to an eighth embodiment.

FIG. 20 is a perspective view illustrating an electronic apparatus according to the eighth embodiment.

A mobile type (or notebook type) personal computer 1100 illustrated in FIG. 20 is an apparatus to which an electronic apparatus of the present embodiment is applied. The personal computer 1100 is configured with a main body section 1104 including a keyboard 1102 and a display unit 1106 including a display section 1108, and the display unit 1106 is rotatably supported with respect to the main body section 1104 via a hinge structure section. The personal computer 1100 includes the physical quantity sensor 1, and a control circuit 1110 (control unit (controller)) which performs control on the basis of a measurement signal output from the physical quantity sensor 1. Any of the above-described physical quantity sensors of the respective embodiments may be used as the physical quantity sensor 1.

Such a personal computer 1100 (electronic apparatus) includes the physical quantity sensor 1, and the control circuit 1110 (control unit) which performs control on the basis of a measurement signal output from the physical quantity sensor 1. Thus, it is possible to achieve the effect of the physical quantity sensor 1 and thus to realize high reliability.

Ninth Embodiment

Next, a description will be made of an electronic apparatus according to a ninth embodiment.

Figure 21:
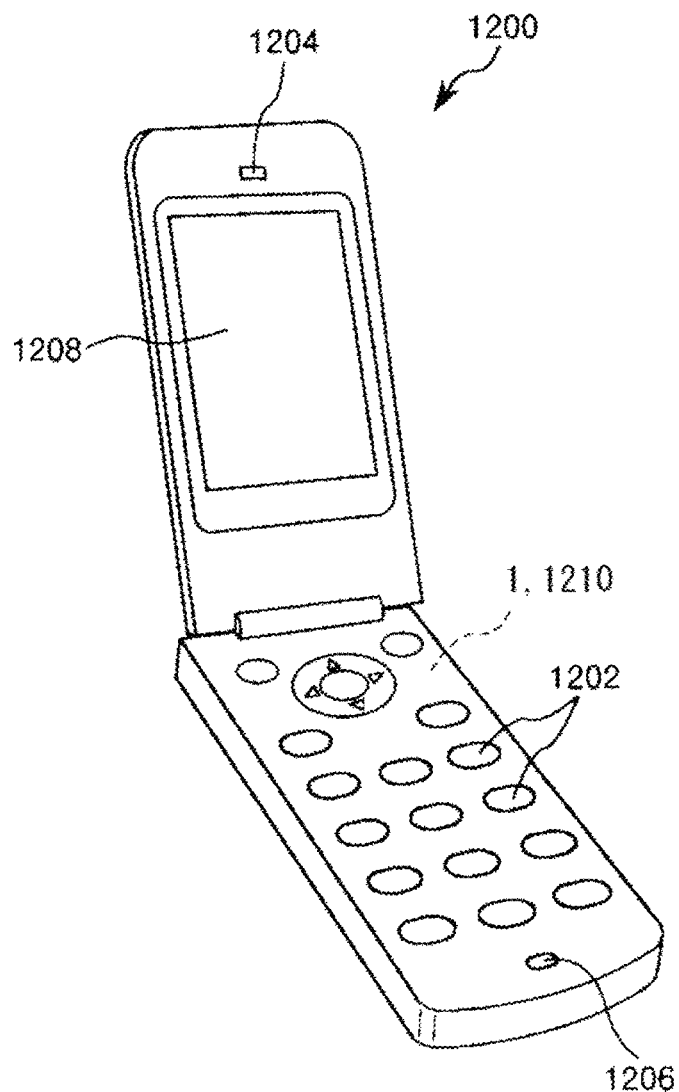
FIG. 21 is a perspective view illustrating an electronic apparatus according to a ninth embodiment.

FIG. 21 is a perspective view illustrating an electronic apparatus according to the ninth embodiment.

A mobile phone 1200 (including a PHS) illustrated in FIG. 21 is a phone to which an electronic apparatus of the present embodiment is applied. The mobile phone 1200 includes an antenna (not illustrated), a plurality of operation buttons 1202, an earpiece 1204, and a mouthpiece 1206, and a display section 1208 is disposed between the operation buttons 1202 and the earpiece 1204. The mobile phone 1200 includes the physical quantity sensor 1, and a control circuit 1210 (control section (controller)) which performs control on the basis of a measurement signal output from the physical quantity sensor 1.

Such a mobile phone 1200 (electronic apparatus) includes the physical quantity sensor 1, and the control circuit 1210 (control section) which performs control on the basis of a measurement signal output from the physical quantity sensor 1. Thus, it is possible to achieve the effect of the physical quantity sensor 1 and thus to realize high reliability.

Tenth Embodiment

Next, a description will be made of an electronic apparatus according to a tenth embodiment.

Figure 22:
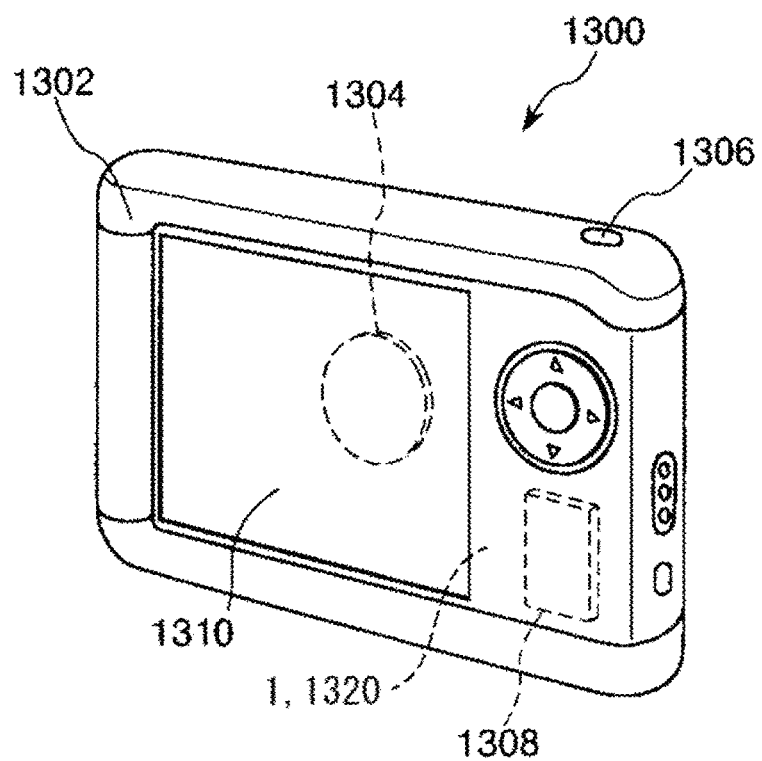
FIG. 22 is a perspective view illustrating an electronic apparatus according to a tenth embodiment.

FIG. 22 is a perspective view illustrating an electronic apparatus according to the tenth embodiment.

A digital still camera 1300 illustrated in FIG. 22 is a phone to which an electronic apparatus of the present embodiment is applied. The digital still camera 1300 includes a case 1302, and a display section 1310 is provided on a rear surface of the case 1302. The display section 1310 performs display on the basis of an imaging signal generated by a CCD, and functions as a view finder which displays a subject as an electronic image. A light reception unit 1304 which includes an optical lens (imaging optical system), a CCD, and the like is provided on a front surface side (the rear surface side in FIG. 22) of the case 1302. When a photographer confirms a subject image displayed on the display section 1310 and presses a shutter button 1306, an imaging signal of the CCD at this point is transmitted to and stored in a memory 1308. The digital still camera 1300 includes the physical quantity sensor 1, and a control circuit 1320 (control section (controller)) which performs control on the basis of a measurement signal output from the physical quantity sensor 1. The physical quantity sensor 1 is used for, for example, camera shaking correction.

The digital still camera 1300 (electronic apparatus) includes the physical quantity sensor 1, and a control circuit 1320 (control section (controller)) which performs control on the basis of a measurement signal output from the physical quantity sensor 1. Thus, it is possible to achieve the effect of the physical quantity sensor 1 and thus to realize high reliability.

The electronic apparatus of the present embodiment is applicable not only to the personal computer and the mobile phone of the above-described embodiments and the digital still camera of the present embodiment but also to, for example, a smart phone, a tablet terminal, a watch (including a smart watch), an ink jet type ejection apparatus (for example, an ink jet printer), a laptop type personal computer, a television set, a wearable terminal such as a head mounted display (HMD), a video camera, a video tape recorder, a car navigation apparatus, a pager, an electronic organizer (including a communication function), an electronic dictionary, an electronic calculator, an electronic gaming machine, a word processor, a workstation, a videophone, a security television monitor, electronic binoculars, a POS terminal, a medical apparatus (for example, an electronic thermometer, a sphygmomanometer, a blood glucose monitoring system, an electrocardiographic apparatus, an ultrasonic diagnostic apparatus, or an electronic endoscope), a fish-finder, various measurement apparatuses, an apparatus for mobile terminal base station, meters and gauges (for example, meters and gauges of vehicles, aircrafts, and ships), a flight simulator, and a network server.

Eleventh Embodiment

Next, a description will be made of a portable electronic apparatus according to an eleventh embodiment.

Figure 23:
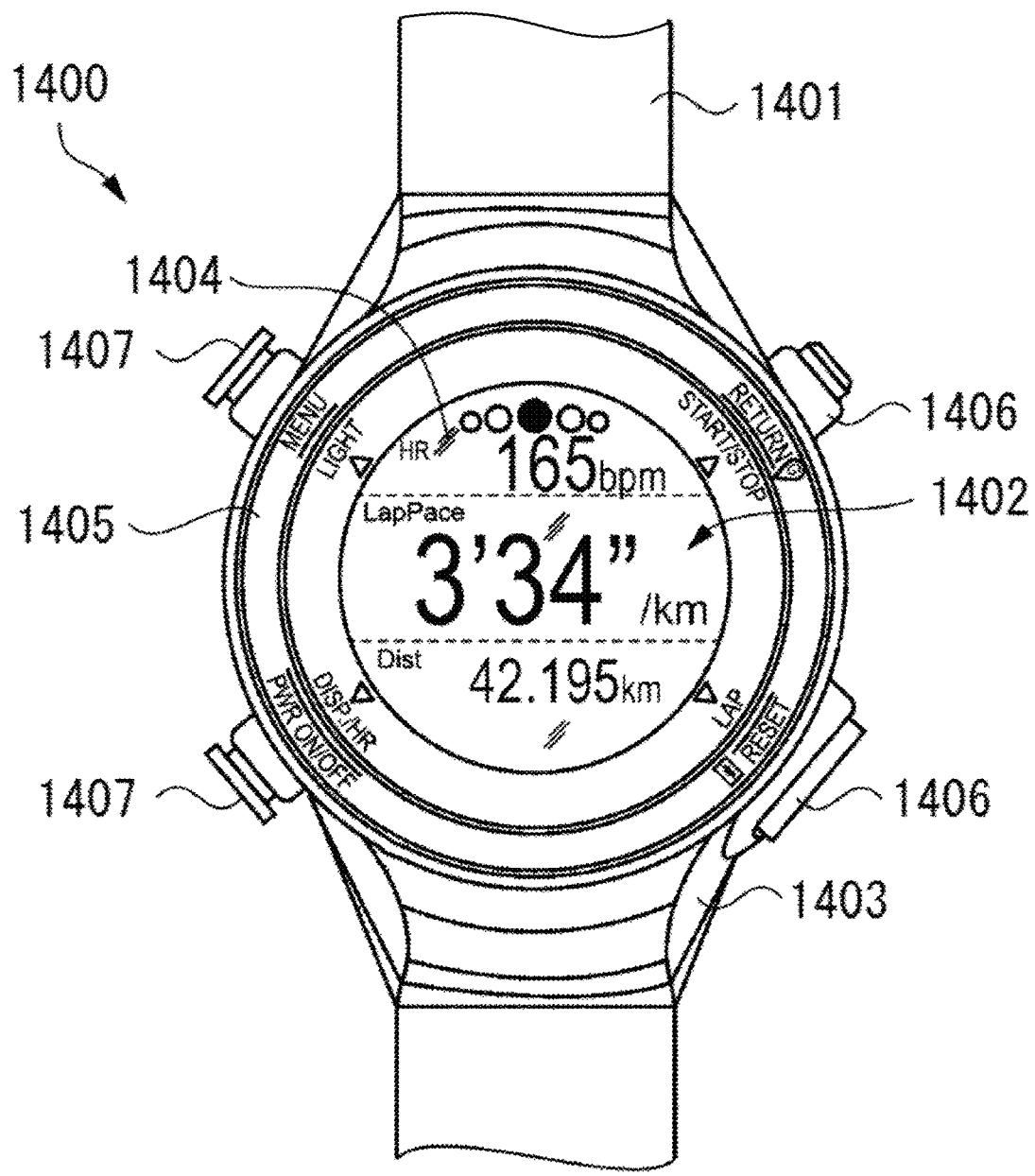
FIG. 23 is a plan view illustrating a portable electronic apparatus according to an eleventh embodiment.
Figure 24:
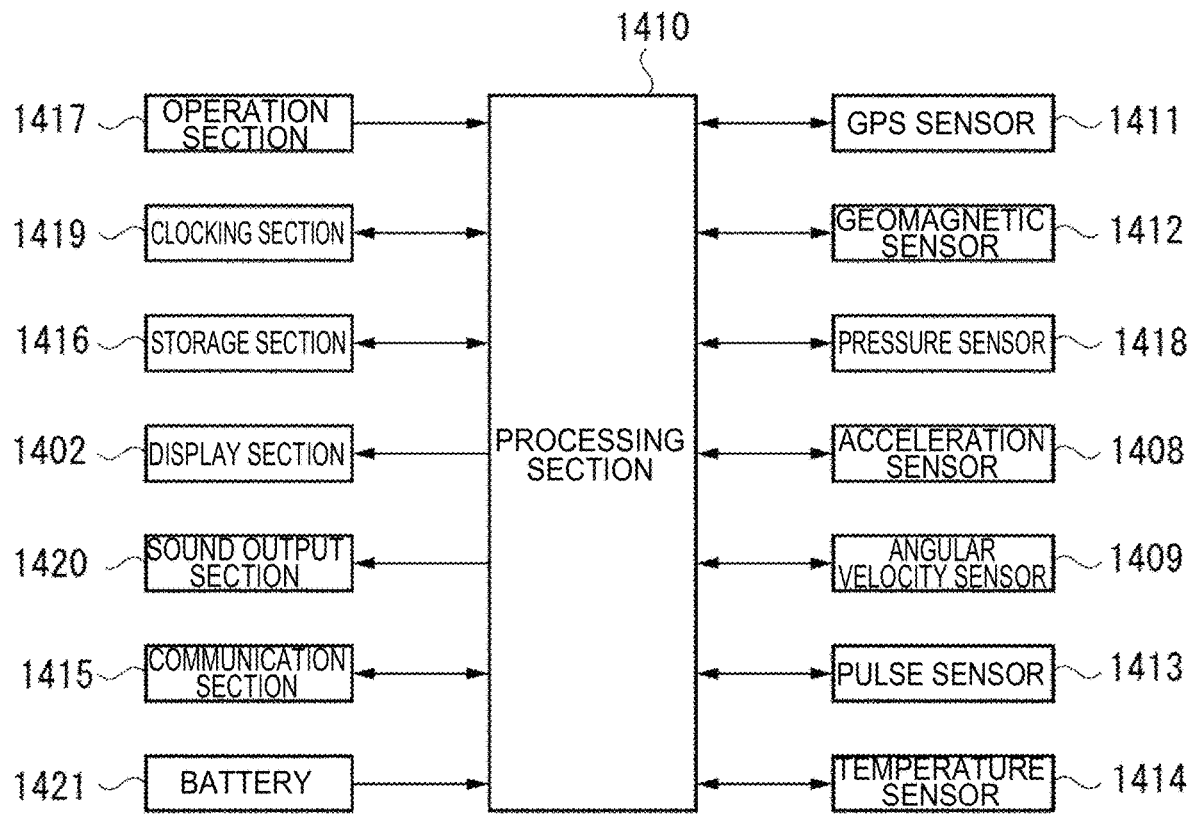
FIG. 24 is a functional block diagram illustrating a schematic configuration of the portable electronic apparatus illustrated in FIG. 23.

FIG. 23 is a plan view illustrating a portable electronic apparatus according to the eleventh embodiment. FIG. 24 is a functional block diagram illustrating a schematic configuration of the portable electronic apparatus illustrated in FIG. 23.

A wristwatch type activity meter 1400 (activity tracker) illustrated in FIG. 23 is a wrist apparatus to which a portable electronic apparatus of the present embodiment is applied. The activity meter 1400 is mounted on a part (subject) such as a user's wrist via a band 1401. The activity meter 1400 is provided with a display section 1402 performing digital display, and can perform wireless communication. A physical quantity sensor according to the present embodiment of the invention is incorporated into the activity meter 1400 as an acceleration sensor 1408 measuring acceleration or an angular velocity sensor 1409 measuring angular velocity.

The activity meter 1400 includes a case 1403 in which the acceleration sensor 1408 and the angular velocity sensor 1409 are accommodated, a processing section (processor) 1410 which is accommodated in the case 1403 and processes data output from the acceleration sensor 1408 and the angular velocity sensor 1409, the display section 1402 which is accommodated in the case 1403, and a light transmissive cover 1404 which closes an opening of the case 1403. A bezel 1405 is provided outside the light transmissive cover 1404. A plurality of operation buttons 1406 and 1407 are provided on a side surface of the case 1403.

As illustrated in FIG. 24, the acceleration sensor 1408 measures respective accelerations in three axial directions which intersect (ideally, orthogonal to) each other, and outputs signals (acceleration signal) corresponding to magnitudes and directions of the measured three-axis accelerations. The angular velocity sensor 1409 measures respective angular velocities in three axial directions which intersect (ideally, orthogonal to) each other, and outputs signals (angular velocity signals) corresponding to magnitudes and directions of the measured three-axis angular velocities.

A liquid crystal display (LCD) configuring the display section 1402 displays, according to various measurement modes, for example, position information using a GPS sensor 1411 or a geomagnetic sensor 1412, motion information such as a movement amount or a motion amount using the acceleration sensor 1408 or the angular velocity sensor 1409, biological information such as a pulse rate using a pulse sensor 1413, or time information such as the current time. An environment temperature using a temperature sensor 1414 may be displayed.

A communication section 1415 performs various pieces of control for establishing communication between a user terminal and an information terminal (not illustrated). The communication section 1415 is configured to include a transceiver conforming to a short-range radio communication standard such as Bluetooth (registered trademark) (including Bluetooth Low Energy (BILE)), Wireless Fidelity (Wi-Fi) (registered trademark), Zigbee (registered trademark), near field communication (NFC), or ANT+ (registered trademark), and a connector conforming to a communication bus standard such as Universal Serial Bus (USB).

The processing section (processor) 1410 is configured with, for example, a micro processing unit (MPU), a digital signal processor (DSP), or an application specific integrated circuit (ASIC). The processing section 1410 performs various processes on the basis of a program stored in a storage section 1416 and a signal which is input from an operation section 1417 (for example, the operation buttons 1406 and 1407). The processes in the processing section 1410 include, for example, a data process on an output signal from each of the GPS sensor 1411, the geomagnetic sensor 1412, a pressure sensor 1418, the acceleration sensor 1408, the angular velocity sensor 1409, the pulse sensor 1413, the temperature sensor 1414, and a clocking section 1419, a display process of displaying an image on the display section 1402, a sound output process of outputting sounds from a sound output section 1420, a communication process of performing communication with an information terminal via the communication section 1415, and a power control process of supplying power to each section from a battery 1421.

The activity meter 1400 may have at least the following functions.

1. Distance: A total distance is measured from measurement starting by using a highly accurate GPS function.
2. Pace: The current traveling pace is displayed through pace distance measurement.
3. Average speed: An average speed is calculated from average speed traveling starting to the current time, and is displayed.
4. Elevation: Elevation is measured and displayed by using the GPS function.
5. Stride: Strides are measured even in a tunnel or the like which GPS electric waves do not reach, and are displayed.
6. Pitch: The number of steps per minute is measured and displayed.
7. Pulse rate: A pulse rate is measured by using the pulse sensor, and is displayed.
8. Gradient: A gradient of the ground is measured and displayed in training or trailing in a mountainous region.
9. Auto lap: Lap measurement is automatically performed in a case where a user runs a predetermined distance or a predetermined time set in advance.
10. Motion calorie consumption: Calorie consumption is displayed.
11. Number of steps: A sum of the number of steps from motion starting is displayed.

The activity meter 1400 (portable electronic apparatus) includes the physical quantity sensor 1, the case 1403 in which the physical quantity sensor 1 is accommodated, the processing section 1410 which is accommodated in the case 1403 and processes data output from the physical quantity sensor 1, the display section 1402 which is accommodated in the case 1403, and the light transmissive cover 1404 which closes the opening of the case 1403. Thus, it is possible to achieve the effect of the physical quantity sensor 1 and thus to realize high reliability.

As described above, the activity meter 1400 includes the GPS sensor 1411 (satellite positioning system), and can thus measure a movement distance or a movement trajectory of a user. Thus, it is possible to provide the highly convenient activity meter 1400.

The activity meter 1400 may be widely applied to a running watch, a runner's watch, a multi-sports compatible runner's watch such as duathlon and triathlon, an outdoor watch, and a satellite positioning system, for example, a GPS watch with a GPS.

In the above description, a global positioning system (GPS) has been described as a satellite positioning system, but other global navigation satellite systems (GNSS) may be used. For example, one, or two or more satellite positioning systems such as a European geostationary-satellite navigation overlay service (EGNOS), a quasi zenith satellite system (QZSS), a global navigation satellite system (GLONASS), GALILEO, and a Beidou navigation satellite system (BeiDou) may be used. As at least one of the satellite positioning systems, a satellite-based augmentation system (SBAS) such as a wide area augmentation system (WAAS) or a European geostationary-satellite navigation overlay service (EGNOS) may be used.

Twelfth Embodiment

Next, a description will be made of a vehicle according to a twelfth embodiment.

Figure 25:
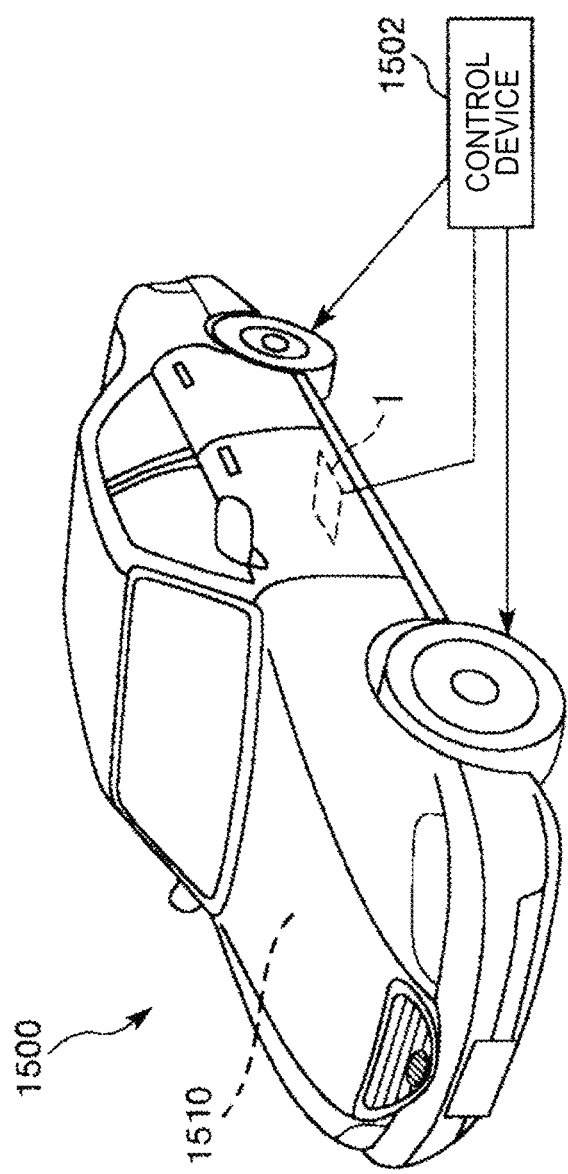
FIG. 25 is a perspective view illustrating a vehicle according to a twelfth embodiment.

FIG. 25 is a perspective view illustrating a vehicle according to the twelfth embodiment.

An automobile 1500 illustrated in FIG. 25 is an automobile to which a vehicle of the present embodiment is applied. In FIG. 25, the automobile 1500 includes at least one system 1510 among an engine system, a brake system, and a keyless entry system. The physical quantity sensor 1 is built into the automobile 1500, and a measurement signal in the physical quantity sensor 1 is supplied to a control device 1502. The control device 1502 may control the system 1510 on the basis of the signal.

Such an automobile 1500 (vehicle) includes the physical quantity sensor 1, and the control device 1502 (control section (controller)) which performs control on the basis of a measurement signal output from the physical quantity sensor 1. Thus, it is possible to achieve the effect of the physical quantity sensor 1 and thus to realize high reliability. The automobile 1500 includes at least one system 1510 among an engine system, a brake system, and a keyless entry system, and the control device 1502 controls the system 1510 on the basis of a measurement signal. Consequently, it is possible to control the system 1510 with high accuracy.

The physical quantity sensor 1 is widely applicable to electronic control units (ECUs) such as a car navigation system, a car air conditioner, an antilock brake system (ABS), an air bag, a tire pressure monitoring system (TPMS), engine control, and a battery monitor of a hybrid car or an electric car.

A vehicle is not limited to the automobile 1500, and is applicable to, for example, an airplane, a rocket, an artificial satellite, a ship, an automated guided vehicle (AGV), a bipedal robot, and an unmanned aircraft such as a drone.

As mentioned above, although the physical quantity sensor, the physical quantity sensor device, the composite sensor device, the inertial measurement unit, the vehicle positioning apparatus, the portable electronic apparatus, the electronic apparatus, and the vehicle according to the embodiments have been described in detail, the invention is not limited thereto, and a configuration of each part may be replaced with any configuration having the same function. Any other configuration may be added to the invention. The above-described embodiments may be combined with each other as appropriate.

In the embodiments, a description has been made of a configuration in which the physical quantity sensor measures an acceleration in the X axis direction, but this is only an example, the physical quantity sensor may measure an acceleration in the Y axis direction, and may measure an acceleration in the Z axis direction. In the embodiments, a description has been made of a configuration in which the physical quantity sensor measures an acceleration, but a physical quantity measured by the physical quantity sensor is not particularly limited, and may be, for example, an angular velocity. The physical quantity sensor may measure a plurality of physical quantities. The plurality of physical quantities may be physical quantities of an identical kind in different measurement axes (for example, an acceleration in the X axis direction, an acceleration in the Y axis direction, an acceleration in the Z axis direction, an angular velocity about the X axis, an angular velocity about the Y axis, and an angular velocity about Z axis), and may be different physical quantities (for example, an angular velocity about the X axis and an acceleration in the X axis direction).

What is claimed is:
1. A physical quantity sensor comprising:
   a substrate;
   a fixed portion that is fixed to the substrate;
   a movable portion that includes a frame part surrounding the fixed portion in a plan view, is connected to the fixed portion, and is displaceable in a first direction with respect to the substrate; and a movable electrode that is supported at the movable portion, wherein the frame part includes a first outer edge that is located on one side of the first direction, and is disposed along a second direction orthogonal to the first direction, and a second outer edge that is located on the other side of the first direction, and is disposed along the second direction, wherein the fixed portion is disposed further toward the second outer edge than the first outer edge, and wherein the substrate includes a first projection part that overlaps the first outer edge in a plan view, and is disposed to be separated from the first outer edge, and a second projection part that overlaps the second outer edge in a plan view, and is disposed to be separated from the second outer edge.

2. The physical quantity sensor according to claim 1, wherein the movable portion is displaced in a third direction orthogonal to the first direction and the second direction, so as to be brought into contact with the first projection part and the second projection part, and wherein a contact area of the movable portion and the first projection part is larger than a contact area of the movable portion and the second projection part.

3. The physical quantity sensor according to claim 2, wherein the first projection part and the second projection part are included in the movable portion in a plan view.

4. The physical quantity sensor according to claim 2, further comprising:

an electrode that is disposed in at least a part of a region overlapping the movable portion in a plan view on a surface of the substrate on the movable portion side, wherein the electrode has the same potential as a potential of the movable portion.

5. The physical quantity sensor according to claim 2, further comprising:

a beam that has a longitudinal shape along the first direction and of which one end is connected to the fixed portion; and a spring that connects the other end of the beam to the movable portion, wherein the substrate includes a third projection part that overlaps the beams in a plan view, and is disposed to be separated from the beam.

6. The physical quantity sensor according to claim 2, wherein the movable portion includes a stem part that is located inside the frame part in a plan view, and has a longitudinal shape along the first direction, and wherein the substrate includes a fourth projection part that overlaps the stem part in a plan view, and is separated from the stem part.

7. The physical quantity sensor according to claim 1, wherein the first projection part and the second projection part are included in the movable portion in a plan view.

8. The physical quantity sensor according to claim 1, further comprising:

an electrode that is disposed in at least a part of a region overlapping the movable portion in a plan view on a surface of the substrate on the movable portion side, wherein the electrode has the same potential as a potential of the movable portion.

9. The physical quantity sensor according to claim 1, further comprising:

a beam that has a longitudinal shape along the first direction and of which one end is connected to the fixed portion; and a spring that connects the other end of the beam to the movable portion, wherein the substrate includes a third projection part that overlaps the beams in a plan view, and is disposed to be separated from the beam.

10. The physical quantity sensor according to claim 1, wherein the movable portion includes a stem part that is located inside the frame part in a plan view, and has a longitudinal shape along the first direction, and wherein the substrate includes a fourth projection part that overlaps the stem part in a plan view, and is separated from the stem part.

11. A physical quantity sensor device comprising:

the physical quantity sensor according to claim 1; and a circuit element.

12. A composite sensor device comprising:

a first physical quantity sensor that is the physical quantity sensor according to claim 1; and a second physical quantity sensor that measures a physical quantity which is different from a physical quantity measured by the first physical quantity sensor.

13. An inertial measurement unit comprising:

the physical quantity sensor according to claim 1; and a control circuit that controls driving of the physical quantity sensor.

14. An electronic apparatus comprising:

the physical quantity sensor according to claim 1; and a control section that performs control on the basis of a measurement signal output from the physical quantity sensor.

15. A vehicle comprising:

the physical quantity sensor according to claim 1; and a control section that performs control on the basis of a measurement signal output from the physical quantity sensor.

* * * * *